(12) United States Patent
Khan et al.

(10) Patent No.: US 11,762,969 B1
(45) Date of Patent: Sep. 19, 2023

(54) SYSTEMS AND METHODS FOR FACILITATING BIOMETRIC RECOGNITION

(71) Applicant: King Saud University, Riyadh (SA)

(72) Inventors: Muhammad Khurram Khan, Riyadh (SA); Saiyed Umer, Kolkata (IN); Ranjeet Kumar Rout, Srinagar (IN); Alamgir Sardar, Kolkata (IN)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 18/096,206

(22) Filed: Jan. 12, 2023

(51) Int. Cl.
| | |
|---|---|
| *G06F 21/00* | (2013.01) |
| *G06F 21/32* | (2013.01) |
| *G06V 40/50* | (2022.01) |
| *G06V 40/18* | (2022.01) |
| *G06V 10/70* | (2022.01) |

(52) U.S. Cl.
CPC ............. *G06F 21/32* (2013.01); *G06V 10/70* (2022.01); *G06V 40/193* (2022.01); *G06V 40/197* (2022.01); *G06V 40/53* (2022.01); *G06F 2221/2117* (2013.01)

(58) Field of Classification Search
CPC . G06F 21/32; G06F 2221/2117; G06V 10/70; G06V 40/193; G06V 40/197; G06V 40/53
See application file for complete search history.

(56) References Cited

U.S. PATENT DOCUMENTS

| | | |
|---|---|---|
| 4,641,349 A | 2/1987 | Flom et al. |
| 7,574,021 B2 | 8/2009 | Matey |
| 9,767,358 B2 | 9/2017 | Xue et al. |

(Continued)

FOREIGN PATENT DOCUMENTS

| | | |
|---|---|---|
| JP | 7001672 B2 | 1/2022 |

OTHER PUBLICATIONS

K. Wang and A. Kumar, "Periocular-Assisted Multi-Feature Collaboration for Dynamic Iris Recognition," in IEEE Transactions on Information Forensics and Security, vol. 16, pp. 866-879, Sep. 10, 2020.*

(Continued)

*Primary Examiner* — Jeffrey C Pwu
*Assistant Examiner* — William A Corum, Jr.

(57) ABSTRACT

The present disclosure provides a method for facilitating biometric recognition. Further, the method includes receiving, using a communication device, a biometric data from a user device. Further, the biometric data includes an eyeball image data. Further, the eyeball image data includes a periocular region image and an iris image. Further, the method includes processing, using a processing device, the biometric data using a machine learning model. Further, the method includes determining, using the processing device, an iris feature based on the processing. Further, the method includes determining, using the processing device, a periocular feature based on the processing. Further, the method includes concatenating, using the processing device, the iris feature and the periocular feature. Further, the method includes generating, using the processing device, an enrolled image data based on the concatenating. Further, the method includes storing, using a storage device, the enrolled image data in a database.

16 Claims, 35 Drawing Sheets

(56) References Cited

U.S. PATENT DOCUMENTS

| | | | |
|---|---|---|---|
| 10,387,724 | B2 | 8/2019 | Santos-Villalobos et al. |
| 2010/0046808 | A1* | 2/2010 | Connell ............... H04L 9/0866 |
| | | | 382/117 |
| 2014/0037152 | A1* | 2/2014 | Tan ..................... G06V 40/171 |
| | | | 382/117 |
| 2017/0076146 | A1* | 3/2017 | Saripalle ............. G06V 10/751 |
| 2020/0302149 | A1* | 9/2020 | Gottemukkula ....... G06N 3/084 |
| 2021/0383111 | A1* | 12/2021 | Ackerman ............. G06V 40/19 |

OTHER PUBLICATIONS

S. Dargan and M. Kumar, "A comprehensive survey on the biometric recognition systems based on physiological and behavioral modalities," Expert Systems with Applications, vol. 143, p. 113114, 2020.

R. W. Frischholz and U. Dieckmann, "Biold: a multimodal biometric identification system," Computer, vol. 33, No. 2, pp. 64-68, 2000.

K. D. Mitnick and W. L. Simon, The art of deception: Controlling the human element of security. John Wiley & Sons, 2011.

A. K. Jain, A. Ross, and S. Prabhakar, "An introduction to biometric recognition," Circuits and Systems for Video Technology, IEEE Transactions on, vol. 14, No. 1, pp. 4-20, 2004.

S. Prabhakar, S. Pankanti, and A. K. Jain, "Biometric recognition: Security and privacy concerns," IEEE security & privacy, No. 2, pp. 33-42, 2003.

S. A. Schuckers, "Spoofing and anti-spoofing measures," Information Security technical report, vol. 7, No. 4, pp. 56-62, 2002.

R. Belguechi, T. Le-Goff, E. Cherrier, and C. Rosenberger, "Study of the robustness of a cancelable biometric system," in 2011 Conference on Network and Information Systems Security. IEEE, 2011, pp. 1-7.

A. Sardar, S. Umer, C. Pero, and M. Nappi, "A novel cancelable facehashing technique based on non-invertible transformation with encryption and decryption template," IEEE Access, vol. 8, pp. 105 263-105 277, 2020.

P. Punithavathi and G. Subbiah, "Can cancellable biometrics preserve privacy?" Biometric Technology Today, vol. 2017, No. 7, pp. 8-11, 2017.

K. W. Bowyer, K. Hollingsworth, and P. J. Flynn, "Image understanding for iris biometrics: A survey," CVIU, vol. 110, No. 2, pp. 281-307, 2008.

D. L. Woodard, S. Pundlik, P. Miller, R. Jillela, and A. Ross, "On the fusion of periocular and iris biometrics in non-ideal imagery," in Pattern Recognition (ICPR), 2010 20th International Conference on. IEEE, 2010, pp. 201-204.

U. Park, A. Ross, and A. K. Jain, "Periocular biometrics in the visible spectrum: A feasibility study," in 2009 IEEE 3rd International Conference on Biometrics: Theory, Applications, and Systems. IEEE, 2009, pp. 1-6.

S. Bharadwaj, H. S. Bhatt, M. Vatsa, and R. Singh, "Periocular biometrics: When iris recognition fails," in 2010 Fourth IEEE International Conference on Biometrics: Theory, Applications and Systems (BTAS). IEEE, 2010, pp. 1-6.

P. E. Miller, J. R. Lyle, S. J. Pundlik, and D. L. Woodard, "Performance evaluation of local appearance based periocular recognition," in 2010 Fourth IEEE International Conference on Biometrics: Theory, Applications and Systems (BTAS). IEEE, 2010, pp. 1-6.

J. Adams, D. L. Woodard, G. Dozier, P. Miller, K. Bryant, and G. Glenn, "Genetic-based type ii feature extraction for periocular biometric recognition: Less is more," in 2010 20th International Conference on Pattern Recognition. IEEE, 2010, pp. 205-208. Journal of Latex Class Files, vol. XX, No. X, XXXX 33.

C. N. Padole and H. Proenca, "Periocular recognition: Analysis of performance degradation factors," in 2012 5th IAPR International conference on biometrics (ICB). IEEE, 2012, pp. 439-445.

K. P. Hollingsworth, S. S. Darnell, P. E. Miller, D. L. Woodard, K. W. Bowyer, and P. J. Flynn, "Human and machine performance on periocular biometrics under near-infrared light and visible light," IEEE transactions on information forensics and security, vol. 7, No. 2, pp. 588-601, 2011.

N. K. Ratha, J. H. Connell, and R. M. Bolle, "Enhancing security and privacy in biometrics-based authentication systems," IBM systems Journal, vol. 40, No. 3, pp. 614-634, 2001.

J. Hammerle-Uhl, E. Pschernig, and A. Uhl, "Cancelable iris biometrics using block re-mapping and image warping," in International conference on information security. Springer, 2009, pp. 135-142.

A. B. J. Teoh and C. T. Yuang, "Cancelable biometrics realization with multispace random projections," Systems, Man, and Cybernetics, Part B: Cybernetics, IEEE Transactions on, vol. 37, No. 5, pp. 1096-1106, 2007.

J. K. Pillai, V. M. Patel, R. Chellappa, and N. K. Ratha, "Secure and robust iris recognition using random projections and sparse representations," Pattern Analysis and Machine Intelligence, IEEE Transactions on, vol. 33, No. 9, pp. 1877-1893, 2011.

P. P. Paul and M. Gavrilova, "Multimodal cancelable biometrics," in 2012 IEEE 11th international conference on cognitive informatics and cognitive computing. IEEE, 2012, pp. 43-49.

M. Butt and N. Damer, "Helper data scheme for 2d cancelable face recognition using bloom filters," in IWSSIP 2014 Proceedings. IEEE, 2014, pp. 271-274.

S. Umer, B. C. Dhara, and B. Chanda, "A novel cancelable iris recognition system based on feature learning techniques," Information Sciences, vol. 406, pp. 102-118, 2017.

Y. Wang, Z. Tian, Y. Sun, X. Du, and N. Guizani, "Preserving location privacy in uasn through collaboration and semantic encapsulation," IEEE Network, vol. 34, No. 4, pp. 284-290, 2020.

Y. Tian, Y. Li, X. Liu, R. H. Deng, and B. Sengupta, "Privacy-preserving biometric-based remote user authentication," Journal of Internet Technology, vol. 20, No. 7, pp. 2265-2276, 2019.

Z. Rui and Z. Yan, "A survey on biometric authentication: Toward secure and privacy-preserving identification," IEEE access, vol. 7, pp. 5994-6009, 2018.

M. B. Kugler, "From identification to identity theft: public perceptions of biometric privacy harms," UC Irvine L. Rev., vol. 10, p. 107, 2019.

S. A. Hossain, M. A. Rahman, and M. A. Hossain, "Edge computing framework for enabling situation awareness in iot based smart city," Journal of Parallel and Distributed Computing, vol. 122, pp. 226-237, 2018.

J. Qiu, H. Li, and C. Zhao, "Cancelable palmprint templates based on random measurement and noise data for security and privacy-preserving authentication," Computers & Security, vol. 82, pp. 1-14, 2019.

V. Sujitha and D. Chitra, "A novel technique for multi biometric cryptosystem using fuzzy vault," Journal of medical systems, vol. 43, No. 5, pp. 1-9, 2019.

L. Fei, G. Lu, W. Jia, S. Teng, and D. Zhang, "Feature extraction methods for palmprint recognition: A survey and evaluation," IEEE Transactions on Systems, Man, and Cybernetics: Systems, vol. 49, No. 2, pp. 346-363, 2018.

S. Umer, B. C. Dhara, and B. Chanda, "Nir and vw iris image recognition using ensemble of patch statistics features," The Visual Computer, pp. 1-18, 2018.

H. Imai, M. Iri, and K. Murota, "Voronoi diagram in the laguerre geometry and its applications," SIAM, vol. 14, No. 1, pp. 93-105, 1985.

L. Masek and P. Kovesi, "Matlab source code for a biometric identification system based on iris patterns," The School of Computer Science and Software Engineering, The University of Western Australia, vol. 26, 2003. Journal of Latex Class Files, vol. XX, No. X, XXXX 34.

Y. Liu, Y. Cao, Y. Li, M. Liu, R. Song, Y. Wang, Z. Xu, and X. Ma, "Facial expression recognition with pca and lbp features extracting from active facial patches," in Real-time Computing and Robotics (RCAR), IEEE International Conference on. IEEE, 2016, pp. 368-373.

(56) References Cited

OTHER PUBLICATIONS

V. Dumoulin and F. Visin, "A guide to convolution arithmetic for deep learning," arXiv preprint arXiv:1603.07285, 2016.
M. Irani, S. Peleg et al., "Motion analysis for image enhancement: Resolution, occlusion, and transparency," J. Vis. Commun. Image Represent., vol. 4, No. 4, pp. 324-335, 1993.
S. Zhou, Y. Wu, Z. Ni, X. Zhou, H. Wen, and Y. Zou, "Dorefa-net: Training low bitwidth convolutional neural networks with low bitwidth gradients," arXiv preprint arXiv:1606.06160, 2016.
W. Ma and J. Lu, "An equivalence of fully connected layer and convolutional layer," arXiv preprint arXiv:1712.01252, 2017.
R. Ferro-P'erez and H. Mitre-Hernandez, "Resmonet: A residual mobile-based network for facial emotion recognition in resource-limited systems," arXiv preprint arXiv:2005.07649, 2020.
C.- Y. Wang, H.-Y. Mark Liao, Y.-H. Wu, P.-Y. Chen, J.-W. Hsieh, and I.-H. Yeh, "Cspnet: A new backbone that can enhance learning capability of cnn," in Proceedings of the IEEE/CVF Conference on Computer Vision and Pattern Recognition Workshops, 2020, pp. 390-391.
S. Ioffe and C. Szegedy, "Batch normalization: Accelerating deep network training by reducing internal covariate shift," arXiv preprint arXiv:1502.03167, 2015.
N. Srivastava, G. Hinton, A. Krizhevsky, I. Sutskever, and R. Salakhutdinov, "Dropout: a simple way to prevent neural networks from overfitting," The journal of machine learning research, vol. 15, No. 1, pp. 1929-1958, 2014.
L. Mescheder, A. Geiger, and S. Nowozin, "Which training methods for gans do actually converge?" arXiv preprintarXiv:1801.04406, 2018.
G. E. Hinton, N. Srivastava, A. Krizhevsky, I. Sutskever, and R. R. Salakhutdinov, "Improving neural networks by preventing co-adaptation of feature detectors," arXiv preprint arXiv:1207.0580, 2012.
D. P. Kingma, "Adam: A method for stochastic optimization/diederik p," Kingma, Jimmy Ba, URL: https://arxiv.org/abs/1412.6980.
D. Scherer, A. Muller, and S. Behnke, "Evaluation of pooling operations in convolutional architectures for object recognition," in International conference on artificial neural networks. Springer, 2010, pp. 92-101.
A. Singh, A. Arora, S. H. Patel, G. Jaswal, and A. Nigam, "Fdfnet: A secure cancelable deep finger dorsal template generation network secured via. bio-hashing," in 2019 IEEE 5th International Conference on Identity, Security, and Behavior Analysis (ISBA). IEEE, 2019, pp. 1-9.
Q. Jiang, Z. Chen, B. Li, J. Shen, L. Yang, and J. Ma, "Security analysis and improvement of bio-hashing based threefactor authentication scheme for telecare medical information systems," Journal of Ambient Intelligence and Humanized Computing, vol. 9, No. 4, pp. 1061-1073, 2018.
T. Tan, Z. He, and Z. Sun, "Efficient and robust segmentation of noisy iris images for non-cooperative iris recognition," Image and vision computing, vol. 28, No. 2, pp. 223-230, 2010.
H. Proenca, S. Filipe, R. Santos, J. Oliveira, and L. A. Alexandre, "The ubiris. v2: A database of visible wavelength iris images captured on-the-move and at-a-distance," IEEE Transactions on Pattern Analysis and Machine Intelligence, vol. 32, No. 8, pp. 1529-1535, 2010.
L. Ma, T. Tan, Y. Wang, and D. Zhang, "Personal identification based on iris texture analysis," PAMI, IEEE Trans. on, vol. 25, No. 12, pp. 1519-1533, 2003.
J.-G. Ko, Y.-H. Gil, J.-H. Yoo, and K.-I. Chung, "A novel and efficient feature extraction method for iris recognition," ETRI journal, vol. 29, No. 3, pp. 399-401, 2007. Journal of Latex Class Files, vol. XX, No. X, XXXX 35.
C. Rathgeb and A. Uhl, "Context-based biometric key generation for iris," IET computer vision, vol. 5, No. 6, pp. 389-397, 2011.
D. M. Monro, S. Rakshit, and D. Zhang, "Dct-based iris recognition," Pattern Analysis and Machine Intelligence, IEEE Transactions on, vol. 29, No. 4, pp. 586-595, 2007.
C. Rathgeb, A. Uhl, and P. Wild, "Iris recognition: from segmentation to template security," 2012.
J. Daugman, "How iris recognition works," csvt, IEEE Trans. on, vol. 14, No. 1, pp. 21-30, 2004.
S. Lazebnik, C. Schmid, and J. Ponce, "Beyond bags of features: Spatial pyramid matching for recognizing natural scene categories," in Computer Vision and Pattern Recognition, 2006 IEEE Computer Society Conference on, vol. 2. IEEE, 2006, pp. 2169-2178.
G. Zhao and M. Pietikainen, "Dynamic texture recognition using local binary patterns with an application to facial expressions," Pattern Analysis and Machine Intelligence, IEEE Transactions on, vol. 29, No. 6, pp. 915-928, 2007.
J. Yang, K. Yu, Y. Gong, and T. Huang, "Linear spatial pyramid matching using sparse coding for image classification," in Computer Vision and Pattern Recognition, 2009. CVPR 2009. IEEE Conference on. IEEE, 2009, pp. 1794-1801.
J. Wang, J. Yang, K. Yu, F. Lv, T. Huang, and Y. Gong, "Locality-constrained linear coding for image classification," in Computer Vision and Pattern Recognition (CVPR), 2010 IEEE Conference on. IEEE, 2010, pp. 3360-3367.
C .-W. Tan and A. Kumar, "Accurate iris recognition at a distance using stabilized iris encoding and zernike moments phase features," Image Processing, IEEE Transactions on, vol. 23, No. 9, pp. 3962-3974, 2014.
J. Chen, F. Shen, D. Z. Chen, and P. J. Flynn, "Iris recognition based on human-interpretable features," IEEE Transactions on Information Forensics and Security, vol. 11, No. 7, pp. 1476-1485, 2016.
H. Proenc, a and J. C. Neves, "Deep-prwis: Periocular recognition without the iris and sclera using deep learning frameworks," IEEE Transactions on Information Forensics and Security, vol. 13, No. 4, pp. 888-896, 2018.
S. Umer, B. C. Dhara, and B. Chanda, "Nir and vw iris image recognition using ensemble of patch statistics features," The Visual Computer, vol. 35, No. 9, pp. 1327-1344, 2019.
R. Dwivedi and S. Dey, "Cancelable iris template generation using look-up table mapping," in 2015 2nd International Conference on Signal Processing and Integrated Networks (SPIN). IEEE, 2015, pp. 785-790.
T. K. Dang, Q. C. Truong, T. T. B. Le, and H. Truong, "Cancellable fuzzy vault with periodic transformation for biometric template protection," IET Biometrics, vol. 5, No. 3, pp. 229-235, 2016.
R. F. Soliman, M. Amin, A. El-Samie, and E. Fathi, "Cancelable iris recognition system based on comb filter," Multimedia Tools and Applications, vol. 79, No. 3, pp. 2521-2541, 2020.
A. Singh, A. Arora, and A. Nigam, "Cancelable iris template generation by aggregating patch level ordinal relations with its holistically extended performance and security analysis," Image and Vision Computing, vol. 104, p. 104017, 2020.
T. Sudhakar and M. Gavrilova, "Cancelable biometrics using deep learning as a cloud service," IEEE Access, vol. 8, pp. 112 932-112 943, 2020.

* cited by examiner

| Layers | OutputShape | | ImageSize | | Parameters | |
|---|---|---|---|---|---|---|
| Block-1 | | | | | | |
| Conv2D(3x3)@32 | (n,n,32) | | (96, 96, 32) | | 896 | |
| BatchNorm | (n,n,32) | | (96, 96, 32) | | 128 | |
| ActivationReLU | (n,n,32) | | (96, 96, 32) | | 0 | |
| Maxpool2D(2x2) | $(n_1,n_1, 32), n_1=n2$ | | (48, 48, 32) | | 0 | |
| Dropout | $(n_1,n_1, 32), n\_1=n/2$ | | (48, 48, 32) | | 0 | |
| Layers | OutputShape | ImageSize | Parameters | Layers | OutputShape | ImageSize | Parameters |
|---|---|---|---|---|---|---|---|
| Block-2 | | | | Block-5 | | | |
| Conv2D (3x3)@64 | $(n_1,n_1, 64)$ | (48,48,64) | ((3x3x32)+1)x64 =18496 | Conv2D (3x3)@256 | $(n_3,n_3,512)$ | (6,6,512) | ((3x3x256)+1)x 512=1180160 |
| Batch Norm | $(n_2,n_2, 64)$ | (48,48,64) | 4x64 = 256 | Batch Norm | $(n_3,n_3,512)$ | (6,6,512) | 4x512=2048 |
| Activation ReLU | $(n_2,n_2, 64)$ | (48,48,64) | 0 | Activation ReLU | $(n_3,n_3,512)$ | (6,6,512) | 0 |
| Maxpool2D (2x2) | $(n_3,n_3, 64)$ $n_3 = n_2 2$ | (24,24,64) | 0 | Maxpool2D (2x2) | $(n_4,n_4,512)$ $n_4 = n_3 2$ | (3,3,512) | 0 |
| Dropout | $(n_3,n_3, 64)$ | (24,24,64) | 0 | Dropout | $(n_4,n_4,512)$ | (3,3,512) | 0 |
| Block-3 | | | | Block-6 | | | |
| Conv2D (3x3)@64 | $(n_2,n_2, 128)$ | (24,24,128) | ((3x3x64)+1)x 128=73856 | Conv2D (3x3)@512 | $(n_4,n_4,1024)$ | (3,3,1024) | ((3x3x512)+1)x 1024=4719616 |
| Batch Norm | $(n_3,n_3, 128)$ | (24,24,128) | 4x128 = 512 | Batch Norm | $(n_4,n_4,1024)$ | (3,3,1024) | 4x1024= 4096 |
| Activation ReLU | $(n_3,n_3, 128)$ | (24,24,128) | 0 | Activation ReLU | $(n_4,n_4,1024)$ | (3,3,1024) | 0 |
| Maxpool2D (2x2) | $(n_4,n_4, 128)$ $n_4 = n_3 2$ | (12,12,128) | 0 | Maxpool2D (2x2) | $(n_5,n_5,1024)$ $n_5 = n_4 2$ | (1,1,1024) | 0 |
| Dropout | $(n_3,n_3, 64)$ | (12,12,128) | 0 | Dropout | $(n_5,n_5,1024)$ | (1,1,1024) | 0 |
| Block-4 | | | | Flatten | | | |
| Conv2D (3x3)@128 | $(n_2,n_2, 128)$ | (12,12,256) | ((3x3x128)+1)x 256=295168 | Flatten | $(1,n_6 \times n_6 \times 1024)$ | (1,1,,1024) | 0 |
| Batch Norm | $(n_3,n_3, 64)$ | (12,12,256) | 4x256 = 1024 | Dense | (1,1024) | (1,1,,1024) | 1049600 |
| Activation ReLU | $(n_3,n_3, 32)$ | (12,12,256) | 0 | Batch Norm | (1,1024) | (1,1,,1024) | 4096 |
| Maxpool2D (2x2) | $(n_4,n_4, 64)$ $n_4 = n_3 2$ | (6,6,256) | 0 | Activation ReLU | (1,1024) | (1,1,,1024) | 0 |
| Dropout | $(n_4,n_4, 128)$ | (6,6,256) | 0 | Dropout | (1,1024) | (1,1,,1024) | 0 |
| Layer | OutputShape | | Image Size | | Parameter | |
|---|---|---|---|---|---|---|
| Flatten | | | | | | |
| Dense | (1, 512) | | (1, 512) | | (524800 | |
| Batch Normalization | (1, 512) | | (1, 512) | | 2048 | |
| Activation ReLU | (1, 512) | | (1, 512) | | 0 | |
| Dense | (1, 300) | | (1, 300) | | (512+1)x300 =153900 | |
| Total Parameters for the Input Image Size | | | | | 8,030,700 | |
| Total Number of Trainable Parameters: | | | | | 8,023,596 | |
| Non-trainable params: | | | | | 7,104 | |

FIG. 10

| Layers | OutputShape | | | ImageSize | | | Parameters |
|---|---|---|---|---|---|---|---|
| | | | | Block-1 | | | |
| Conv2D(3x3)@32 | (n,n,32) | | | (192,192,32) | | | 896 |
| ActivationReLU | (n,n,32) | | | (192,192,32) | | | 0 |
| Maxpool2D(2x2) | $(n_1,n_1, 32), n_1=n2$ | | | (96,96,32) | | | 0 |
| Dropout | $(n_1,n_1, 32), n\_1=n/2$ | | | (96,96,32) | | | 0 |
| Layers | OutputShape | ImageSize | Parameters | Layers | OutputShape | ImageSize | Parameters |
| | Block-2 | | | | Block-5 | | |
| Conv2D (3x3)@64 | $(n_1,n_1, 64)$ | (96,96,64) | ((3x3x32)+1)x64 =18496 | Conv2D (3x3)@256 | $(n_3,n_3,256)$ | (12,12,256) | ((3x3x128)+1)x 256=295168 |
| Batch Norm | $(n_1,n_1, 64)$ | (96,96,64) | 4x64 = 256 | Batch Norm | $(n_3,n_3,256)$ | (12,12,256) | 4x256=1024 |
| Activation ReLU | $(n_2,n_2, 64)$ | (96,96,64) | 0 | Activation ReLU | $(n_3,n_3,256)$ | (12,12,256) | 0 |
| Maxpool2D (2x2) | $(n_3,n_3, 64)$ $n_3 = n_22$ | (48,48,64) | 0 | Maxpool2D (2x2) | $(n_4,n_4,256)$ $n_4 = n_32$ | 6,6,256 | 0 |
| Dropout | $(n_3,n_3, 64)$ | (48,48,64) | 0 | Dropout | $(n_4,n_4,256)$ | 6,6,256 | 0 |
| | Block-3 | | | | Block-6 | | |
| Conv2D (3x3)@64 | $(n_2,n_2, 96)$ | (48,48,96) | ((3x3x64)+1)x 96=55392 | Conv2D (3x3)@512 | $(n_4,n_4,512)$ | (6,6,512) | ((3x3x256)+1)x 512=1180160 |
| Batch Norm | $(n_3,n_3, 96)$ | (48,48,96)) | 4x96 = 384 | Batch Norm | $(n_4,n_4,512)$ | (6,6,512) | 4x512= 2048 |
| Activation ReLU | $(n_3,n_3, 96)$ | (48,48,96)) | 0 | Activation ReLU | $(n_4,n_4,512)$ | (6,6,512) | 0 |
| Maxpool2D (2x2) | $(n_4,n_4, 96)$ $n_4 = n_32$ | (24,24,96)) | 0 | Maxpool2D (2x2) | $(n_5,n_5,512)$ $n_5 = n_42$ | (3,3,512) | 0 |
| Dropout | $(n_4,n_4, 64)$ | (24,24,96)) | 0 | Dropout | $(n_5,n_5,512)$ | (3,3,512) | 0 |
| | Block-4 | | | | Block 7 | | |
| Conv2D (3x3)@128 | $(n_2,n_2, 128)$ | (24,24,128) | ((3x3x96)+1)x 128=110720 | Conv2D(3 x3@512) | $(n_5,n_5,1024)$ | (3,3,1024) | ((3x3x512)+1)x 1024=4719616 |
| Batch Norm | $(n_3,n_3, 128)$ | (24,24,128) | 4x128 = 512 | Batch Norm | $(n_5,n_5,1024)$ | (3,3,1024) | 4096 |
| Activation ReLU | $(n_3,n_3, 128)$ | (24,24,128) | 0 | Activation ReLU | $(n_5,n_5,1024)$ | (3,3,1024) | 0 |
| Maxpool2D (2x2) | $(n_4,n_4, 128)$ $n_4 = n_32$ | (12,12,128) | 0 | Maxpool2D (2x2) | $(n_6,n_6,1024)$ $n_6=n_52$ | (1,1,1024) | 0 |
| Dropout | $(n_4,n_4, 128)$ | (12,12,128) | 0 | Dropout | $(n_6,n_6,1024)$ | (1,1,1024) | 0 |

| Flatten | | | |
|---|---|---|---|
| Layer | OutputShape | Image Size | Parameter |
| Flatten | | | |
| Dense | (1,1024) | (1,1024) | 1049600 |
| Batch Normalization | (1,1024) | (1,1024) | 4096 |
| Activation ReLU | (1,1024) | (1,1024) | 0 |
| Dense | (1,512) | | |
| Flatten | | | |
| Layer | OutputShape | Image Size | Parameter |
| Flatten | | | |
| Dense | (1,512) | (1,512) | (1024+1)x512= 524800 |
| Batch Normalization | (1,512) | (1,512) | 2048 |
| Activation ReLU | (1,512) | (1,300) | 0 |
| Dense | (1,512) | | 0 |
| Dense (300 Class) | | | (512+1)x300=153900 |
| Total Parameters for the Input Image Size | | | 8,123,340 |
| Total number of Trainable Parameters: | | | 8,116,044 |
| Non-trainable params: | | | 7,296 |

FIG. 12B

| Database | Subject | Samples/Subject |
|---|---|---|
| CASIA-DIST | 138 | 8 (Left & Right) |
| UBIRIS.v2 | 211 | 8 (Left & Right) |

FIG. 19

| CASIA-V4-Distance Database | CNN$_1$ | | CNN$_2$ | |
|---|---|---|---|---|
| | CRR | EER | CRR | EER |
| Left-Iris | 82.89 | 0.0213 | 92.02 | 0.0056 |
| Right-Iris | 83.33 | 0.0209 | 91.30 | 0.0089 |
| UBIRIS.v2 Database | CNN$_1$ | | CNN$_2$ | |
| | CRR | EER | CRR | EER |
| Left-Iris | 47.56 | 0.3156 | 49.55 | 0.2931 |
| Right-Iris | 51.78 | 0.2176 | 54.89 | 0.1206 |

FIG. 23

| Database | CNN$_1$ | CNN$_2$ | FLF* |
|---|---|---|---|
| CASIA-V4-Distance | Acc. (%) | Acc. (%) | Acc. (%) |
| Left Iris | 91.56 | 93.61 | 94.68 |
| Right Iris | 92.17 | 93.87 | 95.91 |
| Left Periocular | 98.72 | 98.78 | 99.65 |
| Right Periocular | 99.05 | 99.59 | 99.89 |
| UBIRIS.v2 | Acc. (%) | Acc. (%) | Acc. (%) |
| Left Iris | 51.43 | 53.67 | 56.82 |
| Right Iris | 54.76 | 56.31 | 58.45 |
| Left Periocular | 69.71 | 78.57 | 80.95 |
| Right Periocular | 71.35 | 79.21 | 82.35 |

FIG. 24

| Database | CASIA-V4-Distance | | UBIRIS.v2 | |
|---|---|---|---|---|
| | Left | Right | Left | Right |
| Iris | 94.68 | 95.91 | 56.82 | 58.45 |
| Periocular | 99.65 | 99.89 | 80.95 | 82.35 |
| Pre-Fusion (FLF*) | 99.81 | 99.93 | 86.72 | 87.46 |
| Post-Fusion (SLF)-1 | 98.26 | 98.36 | 81.29 | 82.91 |
| Post-Fusion (SLF)-2 | 99.62 | 99.06 | 82.31 | 83.17 |

FIG. 25

| Database | CASIA-V4-Distance | | UBIRIS.v2 | |
|---|---|---|---|---|
| | Iris | Periocular | Iris | Periocular |
| Left | 94.68 | 99.65 | 56.82 | 80.95 |
| Right | 95.91 | 99.89 | 58.45 | 82.35 |
| Pre-Fusion (FLF*) | 97.65 | 99.96 | 64.56 | 87.44 |
| Post-Fusion (SLF)-1 | 95.31 | 99.91 | 59.73 | 83.12 |
| Post-Fusion (SLF)-2 | 95.67 | 99.91 | 61.15 | 83.35 |

FIG. 26

| Database Method | CASIA-V4-Distance | | UBIRIS.v2 | |
|---|---|---|---|---|
| | Iris | Periocular | Iris | Periocular |
| Masek [1] | 63.39 | 61.78 | 59.90 | 63.71 |
| Ma [2] | 59.31 | 52.21 | 53.19 | 48.39 |
| Gabor [7] | 63.65 | 52.32 | 51.89 | 48.12 |
| VQ-SPM [8] | 73.41 | 65.34 | 66.18 | 62.32 |
| LBP [9] | 38.71 | 41.78 | 42.78 | 51.47 |
| Ko [54] | 61.79 | 59.24 | 65.12 | 62.12 |
| Monro [5] | 59.12 | 62.12 | 46.60 | 53.91 |
| SRC-SPM [10] | 79.12 | 69.12 | 72.89 | 69.51 |
| Rathgeb [4] | 51.89 | 49.25 | 48.12 | 57.12 |
| LLC-SPM [11] | 76.82 | 71.45 | 75.12 | 70.12 |
| Tan Kumar [12] | 94.50 | 63.00 | 83.00 | 82.31 |
| Chen [13] | 95.05 | 71.65 | 81.78 | 82.90 |
| Proencca [14] | 94.78 | 82.87 | 82.76 | 88.07 |
| Umer [15] | 92.03 | 89.94 | 63.31 | 77.35 |
| Proposed (FLF*) | 95.30 | 99.74 | 64.78 | 82.62 |
| Proposed (FLF#) | 99.77 | | 87.09 | |

FIG. 27

| Features | 10 dim | | 20 dim | | 50 dim | | 100 dim | |
|---|---|---|---|---|---|---|---|---|
| | Using $CBS_1$ | | | | | | | |
| Database | CRR | EER | CRR | EER | CRR | EER | CRR | EER |
| | Casia-v4-distance | | | | | | | |
| Left-Iris | 30.26 | 0.3132 | 59.62 | 0.2151 | 67.62 | 0.1192 | 77.36 | 0.1189 |
| Right-Iris | 48.03 | 0.3392 | 59.84 | 0.2117 | 67.84 | 0.1167 | 78.95 | 0.1308 |
| Left-Periocular | 25.19 | 0.3376 | 59.42 | 0.2081 | 67.69 | 0.1091 | 79.75 | 0.1307 |
| Right-Periocular | 25.19 | 0.3376 | 59.42 | 0.2081 | 67.69 | 0.1091 | 79.95 | 0.1307 |
| | Ubiris.v2 | | | | | | | |
| Left-Iris | 41.08 | 0.4019 | 71.78 | 0.2005 | 80.56 | 0.0845 | 81.67 | 0.0915 |
| Right-Iris | 43.00 | 0.3868 | 73.45 | 0.1965 | 81.78 | 0.0791 | 82.34 | 0.0715 |
| Left-Periocular | 58.33 | 0.2871 | 73.67 | 0.1903 | 81.67 | 0.0749 | 82.56 | 0.0691 |
| Right-Periocular | 58.33 | 0.2871 | 73.67 | 0.1903 | 81.67 | 0.0749 | 82.56 | 0.0690 |
| | Using $CBS_2$ | | | | | | | |
| Database | Casia-v4-distance | | | | | | | |
| Left-Iris | 96.92 | 0.0105 | 100 | 0000 | 100 | 0000 | 100 | 0000 |
| Right-Iris | 97.00 | 0.0182 | 100 | 0000 | 100 | 0000 | 100 | 0000 |
| Left-Periocular | 96.89 | 0.0171 | 100 | 0000 | 100 | 0000 | 100 | 0000 |
| Right-Periocular | 96.89 | 0.0171 | 100 | 0000 | 100 | 0000 | 100 | 0000 |
| | Ubiris.v2 | | | | | | | |
| Left-Iris | 99.92 | 0.0091 | 100 | 0000 | 100 | 0000 | 100 | 0000 |
| Right-Iris | 98.83 | 0.0086 | 100 | 0000 | 100 | 0000 | 100 | 0000 |
| Left-Periocular | 98.71 | 0.0067 | 100 | 0000 | 100 | 0000 | 100 | 0000 |
| Right-Periocular | 98.71 | 0.0067 | 100 | 0000 | 100 | 0000 | 100 | 0000 |

FIG. 28

| Method | CASIA-V4-Distance | | UBIRIS.v2 | |
|---|---|---|---|---|
| Features+ Cancelable Technique | Periocular | Iris | Periocular | Iris |
| Gabor filter +Cancelable | 69.15 0.0494 | 67.89 0.0541 | 64.78 0.2110 | 73.45 0.0187 |
| SIFT+ SparseRrepresentation +Cancelable | 89.37 0.0087 | 85.89 0.0072 | 84.17 0.0103 | 94.67 0.0076 |
| PCA +Cancelable | 55.17 0.0717 | 52.13 0.0821 | 31.29 0.6792 | 45.89 0.3704 |
| Gabor filter +Cancelable | 38.69 0.3210 | 31.67 0.5479 | 37.78 0.2694 | 49.78 0.3521 |
| Deep learning +Cancelable | 89.15 0.0235 | 86.98 0.0319 | 84.79 0.0056 | 93.33 0.0107 |
| Patch-based Coding-scheme+ ProposedCancelable | 98.15 0.0004 | 99.79 0.0003 | 98.83 0.0006 | 98.71 0.0067 |
| CNN +Cancelable | 93.95 0.0032 | 93.78 0.0034 | 91.89 0.0107 | 94.89 0.0082 |
| Proposed | 100.00 0.0000 | 100.00 0.0000 | 100.00 0.0000 | 100.00 0.0000 |

FIG. 29

| Database | Execution time (in seconds) for the operations | | | | | | | |
|---|---|---|---|---|---|---|---|---|
| | $t_1$ | $t_2$ | $t_3$ | $t_4$ | $t_5$ | $t_6$ | Avg. $t_e$ | Total $t_a$ |
| | UBIRIS-v2 | | | | | | | |
| $Bos_l$ | 0.2017 | 0.3123 | 0.3043 | 0.0227 | 0.0603 | 0.0612 | 0.9013 | 0.5979 |
| $Bos_r$ | 0.2335 | 0.3019 | 0.3125 | 0.0221 | 0.0631 | 0.0623 | 0.9331 | 0.6198 |
| | CASIA-V4-distance | | | | | | | |
| $Cas_l$ | 0.2131 | 0.3691 | 0.2840 | 0.0254 | 0.0625 | 0.0608 | 0.9541 | 0.6684 |
| $cas_r$ | 0.2012 | 0.3672 | 0.2750 | 0.0232 | 0.0641 | 0.0623 | 0.9307 | 0.6539 |

FIG. 30

| Operations | Time complexity |
|---|---|
| Cancelable Biometrics | |
| Projection (Eq. 12) | $O(m)$<br>m=dimension of random matrix |
| Permutations (Eq. 13) | $max(O(2^m), O(2^m)) = O(2^m)$<br>m=dimension of feature vector |
| Total | $max(O(m), O(2^m)) = O(2^m)$ |
| Key generation | |
| Min heap (H) construction with n distinct features | $n \times (logn) = O(n(logn))$ |
| Extract tow least probabilities for H | $2 \times (n-1) \times (logn) = O(nlogn)$ |
| Find sum of least probabilities | $O(1)$ |
| Assign two children of new node | $O(1)$ |
| Include new node into H | $(n-1) \times (logn) - O(nlogn)$ |
| Extract minimum node (i.e. rood node) from H | $O(1)$ |
| Assign edge values of the children | $O(logn)$ |
| Print assigned path values as codewords | $O(logn)$ |
| Total | $max(O(nlogn), O(1), O(logn))$<br>$=O(nlogn)$ |
| Bio-Cryptosystem | |
| Checksum calculation | $O(1)$ |
| Polynomial transform | $O(1)$ |
| Template integration | $O(n)$ |
| Vault generation | $O(n^2)$ |
| Total | $O(n^2)$ |
| Overall Complexity of the system | $max(O(2^m), O(n^2), O(nlogn))$<br>$=O(2^m)$ |

FIG. 31

SYSTEMS AND METHODS FOR FACILITATING BIOMETRIC RECOGNITION

FIELD OF THE INVENTION

The present disclosure generally relates to image analysis. More specifically, the present disclosure relates to systems and methods for facilitating biometric recognition.

BACKGROUND OF THE INVENTION

A biometric-based recognition system is used for authenticating a person for e-commerce, border security controls, baking applications, various banking government sectors, etc. The Biometric-based system uses several biometric traits such as physical characteristics (i.e., face, iris, Iris, hand geometry, hand vein, fingerprints, ear shape, tooth shape, DNA, etc.) and behavioral characteristics (i.e., voice, gait, signature, and keystroke dynamics, etc.) for authenticating the person. Further, the biometric-based recognition system requires the person's physical presence and stores the biometric traits like Iris, fingerprints, Iris, Face, Hand geometry, etc., of the person on a microchip for authentication purposes. Among the several biometric traits, the iris is unique to each individual, and even the left and right eyes of the same person or identical twins have unique iris patterns, therefore most biometric-based recognition systems use iris recognition.

The biometric-based recognition systems face drawbacks such as risks associated with the compromising of the biometric data of the individual, heavy cost associated with the implementation of the biometric authentication system, problems associated with injured or missing body parts which are used as the trait during authentication, vulnerability to spoofing attacks associated with the biometric trait, reluctances of some people regarding capturing of their biometric data, changes in the face of the person due to increasing age or diseases, etc. One of the most important drawbacks of the biometric-based recognition system is that once the biometric data of a person has been stolen or compromised, that person's identity is compromised, and that biometric can not be further used for the authentication of that person.

Existing biometric-based (iris) recognition systems which take in eyeball images suffer from various noise artifacts such as shadows and specular reflections on the iris portion, specular reflectance on sclera region, occlusion by eyelid and eyelashes, occlusion by the hair, occlusion by eyeglasses, off-angle, motion blur, rotated and non-uniform illumination conditions. And even after the existing biometric-based recognition systems preprocesses the eyeball images, the extracted normalized iris and periocular biometric patterns suffer from these noise artifacts and challenging issues. Due to these issues, the low variability between inter-class images (images of different persons) or high variability between intra-class images (images of the same person) exist which complicates the iris recognition problems associated with the existing biometric-based recognition systems to a great extent. This results in poor performance of the existing biometric-based recognition systems for real-life applications.

Further, the conventional biometric-based recognition system may face problems because the traditional cryptographic algorithms used by the conventional biometric-based recognition system are time-consuming, while real-time identification associated with real-life applications demands faster comparisons of biometrics.

Therefore, there is a need for a real-time biometric identification system and methods to provide a higher level of biometric features protection schemes with robust and faster authorization that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating biometric recognition. Further, the method may include receiving, using a communication device, a biometric data of a biometric from a user device associated with a user. Further, the biometric data includes an eyeball image data of one or more of a left eye and a right eye. Further, the eyeball image data includes a periocular region image of a periocular region of one or more of the left eye and the right eye and an iris image of an iris of one or more of the left eye and the right eye. Further, the biometric includes the periocular region and the iris. Further, the method may include processing, using a processing device, the biometric data using a machine learning model. Further, the method may include determining, using the processing device, one or more iris features of the iris based on the processing. Further, the method may include determining, using the processing device, one or more periocular features of the periocular region based on the processing. Further, the method may include concatenating, using the processing device, the one or more iris features and the one or more periocular features. Further, the method may include generating, using the processing device, an enrolled image data based on the concatenating. Further, the method may include storing, using a storage device, the enrolled image data in a database.

Further, disclosed herein is a system for facilitating biometric recognition. Further, the system may include a communication device configured for receiving a biometric data of a biometric from a user device associated with a user. Further, the biometric data includes an eyeball image data of one or more of a left eye and a right eye. Further, the eyeball image data includes a periocular region image of a periocular region of one or more of the left eye and the right eye and an iris image of an iris of one or more of the left eye and the right eye. Further, the biometric includes the periocular region and the iris. Further, the system may include a processing device communicatively coupled with the communication device. Further, the processing device may be configured for processing the biometric data using a machine learning model. Further, the processing device may be configured for determining one or more iris features of the iris based on the processing. Further, the processing device may be configured for determining one or more periocular features of the periocular region based on the processing. Further, the processing device may be configured for concatenating the one or more iris features and the one or more periocular features. Further, the processing device may be configured for generating an enrolled image data based on the concatenating. Further, the system may include a storage device communicatively coupled with the processing device. Further, the storage device may be configured for storing the enrolled image data in a database.

Both the foregoing summary and the following detailed description provide examples and are explanatory only.

Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 10 illustrates a table comprising layers, an output shape, an image size, and parameters of a convolutional neural network (CNN) architecture, in accordance with some embodiments.

FIG. 12A illustrates a table comprising layers, an output shape, an image size, and parameters of a convolutional neural network (CNN) architecture, in accordance with some embodiments.

FIG. 12B illustrates a continuation of the table of FIG. 12A, in accordance with some embodiments.

FIG. 19 illustrates a table of database data for facilitating biometric recognition, in accordance with some embodiments.

FIG. 23 illustrates a table of a performance data of a system for facilitating biometric recognition, in accordance with some embodiments.

FIG. 24 illustrates a table of a performance data of a system for facilitating biometric recognition, in accordance with some embodiments.

FIG. 25 illustrates a table of a performance data of a system for facilitating biometric recognition, in accordance with some embodiments.

FIG. 26 illustrates a table of a performance data of a system for facilitating biometric recognition, in accordance with some embodiments.

FIG. 27 illustrates a table of a comparison of the performance of a system for facilitating biometric recognition, in accordance with some embodiments.

FIG. 28 illustrates a table of a performance data of a system for facilitating biometric recognition, in accordance with some embodiments.

FIG. 29 illustrates a table of a comparison of a performance of a system for facilitating biometric recognition, in accordance with some embodiments.

FIG. 30 illustrates a table comprising an execution time for a system for facilitating biometric recognition, in accordance with some embodiments.

FIG. 31 illustrates a table comprising time complexities of a system for facilitating biometric recognition, in accordance with some embodiments.

DETAILED DESCRIPTION OF THE INVENTION

Figure 1:
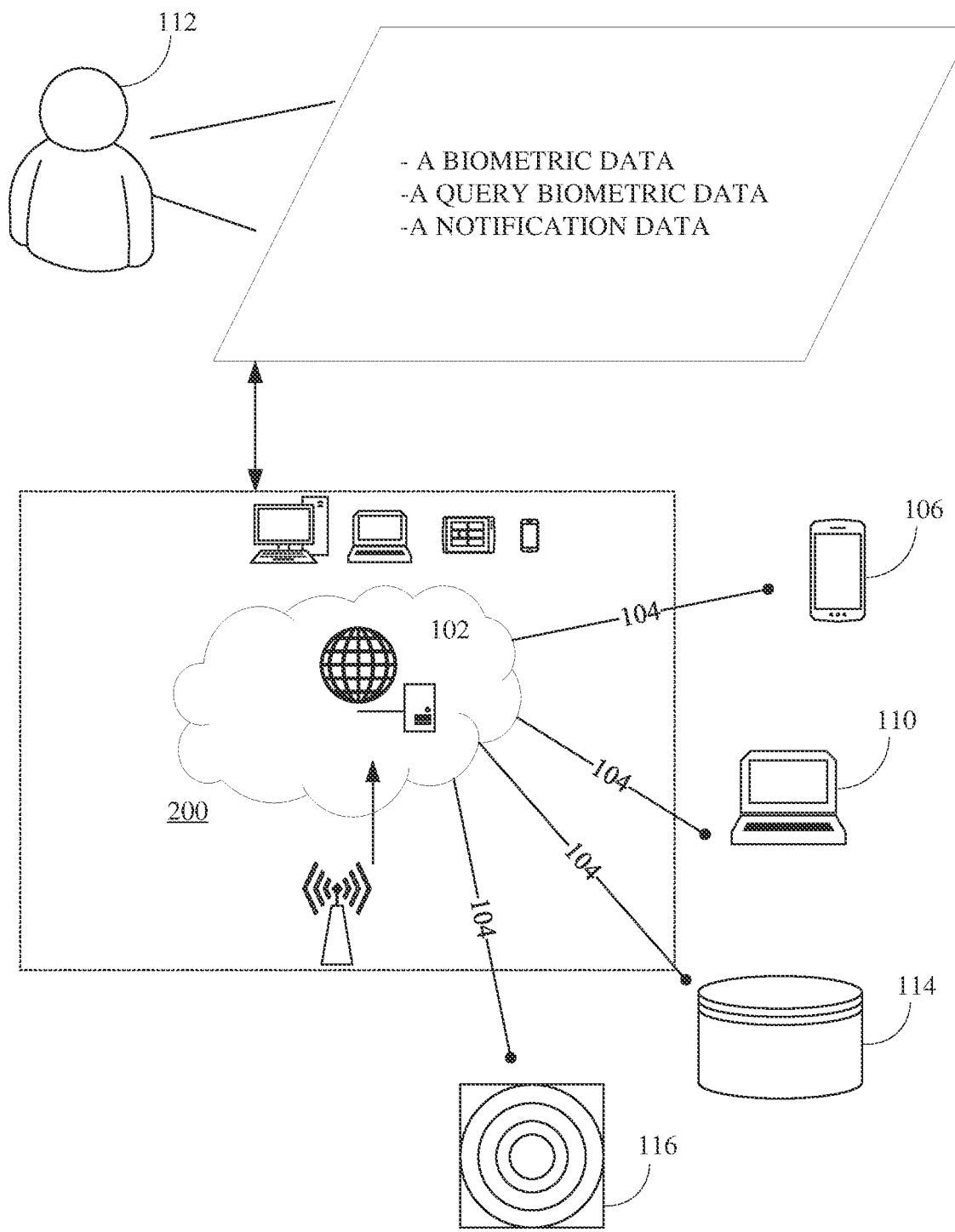
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems and methods for facilitating biometric recognition.

The present disclosure describes a deep learning-based iris recognition system in a secure domain. Further, an implementation of the deep learning-based iris recognition system may be divided into five components. Further, in the first component of the five components image preprocessing tasks are performed to extract a region of interest for iris and periocular biometrics from an eyeball image of a person. Further, in the second component of the five components deep learning-based feature representation schemes, along with a person's identification and verification of an iris and periocular biometric system are performed. Further, one or more advanced feature representation techniques such as multi-resolution image analysis, fine-tuning, transfer learning, multi-algorithm, multi-biometric, and multi-instance schemes may be employed in the third component of the five components for enhancing the performance of the deep learning-based iris recognition system by accepting one or more challenging issues of unconstrained imaging environments. Further, discriminant and distinctive features may be extracted from one or more intermediate deep features that may facilitate a high generalization capability of distinguishing patterns in biometric traits. Further, one or more feature-level fusions schemes may be incorporated that may enhance securities, irrevocability, and non-transferability of extracted biometric features in the fourth component of the five components. Further, a user biometric-based key generation scheme and a modified version of the cancelable biometric system may be introduced to enhance biometric information from external attacks and misuse in the fifth component of the five components. Further, a token-based 'vault' using fuzzy logic techniques may be introduced with cancelable biometrics to provide a Bio-ID card-based faster and independent authentication system. Further, the performance of the deep learning-based iris recognition system may be tested on two eyeball image databases. Further, the two eyeball image databases may include 'CASIA-V4-Distance', and UBIRIS.v2'.

Further, the present disclosure describes a cancelable biometric recognition system. Further, the cancelable biometric recognition system may protect a biometric data of an individual. Further, the cancelable biometric recognition system uses cancelable biometrics. Further, the usage of the cancelable biometrics is advantageous because if the cancelable biometric template gets compromised, then by simply changing the assigned token, the cancelable feature template can be changed and reused. Further, the cancelable biometric recognition system may be vulnerable to some attacks such as replay, brute-force, channel, presentation, stolen-token attacks, reconstruction, false acceptance, etc.

Further, the present disclosure describes the cancelable biometric recognition system with two feature-level template protection methods. Further, the two-level template protection methods may include cancelable biometrics and biometric cryptosystem. Further, the cancelable biometrics may transform a raw biometric to a distorted form using a one-way function so that attacker may not invert it to the original raw biometric features. Further, during authentication, query cancelable biometrics may be compared with database templates within a transmuted domain, and the decision may be reflected in match or non-match. Further, there may be a possibility of failure of the cancelable biometrics against preimage, brute-force, Trojan horse, database, and channel attacks. Further, the security of the cancelable biometric method may depend on the privacy of a parameter (token) used for the distortion process. Further, an attacker may invert the distorted biometric to the original biometric feature if the key is lost. Further, in a biometric cryptosystem, data may be encrypted before being stored. Further, the stored template may be decrypted to compare with query data during the authentication. Further, the encryption process may release a cryptographic key or decryption key. Further, the security of the biometric cryptosystem depends on the secrecy of the key.

Further, the present disclosure describes a method that may only allow encrypted templates to transmit through communication links and may store the encrypted templates in the database to preserve them from external attacks and misuse.

Further, the present disclosure describes developing an Iris recognition system in a secure domain, employing deep learning-based methods for extracting discriminant features from biometric traits obtained from eyeball images, introducing multi-algorithm, multi-biometrics, and multi-instance approaches for the single source of biometrics to enhance performance and security, introducing a higher level of template protection schemes using cancelable biometrics which may be user token independent, and introducing a faster bio-cryptosystem by providing dynamic authentication that combines more authorization techniques for seamless biometric systems.

Further, the present disclosure describes implementing a system having four components: (i) image preprocessing, (ii) deep features extraction and classification, (iii) cancelable biometric for template protection, and (iv) faster bio cryptosystem with dynamic authentication.

Further, the present disclosure describes the usage of a single eyeball image to extract the Iris and Periocular biometrics of the same person and then multi-algorithm and multi-biometric schemes are employed to enhance the recognition performance.

Further, the present disclosure describes the combining of the biometric pieces of information through feature-level fusion techniques which introduce the discriminant features and increase both security and performance.

Further, the present disclosure describes the introduction of multi-instance biometric schemes to enhance the performance and security levels of the authentication system, where the performance of the left iris and right iris are fused to make the final decision during authentication.

Further, the present disclosure describes the key generation technique for the cancelable biometric system for biometric template protection, the key generation technique preserves the biometric information from external attacks and misuse while improving security and does not need to require the user token.

Further, the present disclosure describes a bio-cryptosystem for dynamic authentication with robust and faster authorization for access control systems. Further, the bio-cryptosystem has several applications for seamless biometric systems along with Bio-ID card-based technologies.

Further, the present disclosure describes a secure person identification using an iris recognition system. The components of the system may include (i) image preprocessing, (ii) feature representation with classification, (iii) key generation, (iv) cancelable biometric recognition, and (v) bio-Cryptosystem.

Further, the system may employ Iris preprocessing. In the iris preprocessing, a circular disc of the iris portion (the region between pupil and iris regions) is segmented out from an eyeball image E. Then the segmented circular disc is transformed from the Cartesian coordinate to the polar coordinate system to get the normalized iris pattern, the region of interest. During processing, each input eyeball-colored image E is transformed into grayscaled image (FIG.

7(a)). Then a median filter is applied to suppress the noise (FIG. 7(b)). Since the pupil region corresponds estimate to the darker region, so, a threshold value 'th' has been estimated and applied on E to get a binary image B (FIG. 7(c)). Further, mathematical morphology-based boundary extraction algorithms are applied to B to get edge map binary image B' 2(d)). To remove small connected components, morphological area operators are applied on B' to get another image B". Further, to the desired inner pupil region center and radius, Circular Hough Transformation (CHT) based technique is applied on B" (FIG. 7(e)). For the Near Infrared (NIR) camera images, there is high contrast between the pupil and iris region than in the iris and sclera region. In contrast, the iris region is slightly less dark than the pupil region in the visual wavelength (VW) camera images. To make the system more convenient in both cases, the inversion transformation based technique is applied after pupil region segmentation. To make the system more convenient in both cases, the pupil region is obtained first and then the iris region concerning the pupil center and radius is estimated. For this purpose, the inversion transformation based technique is employed during iris boundary detection where the intensity variation profile is estimated horizontally and then vertically concerning the calculated pupil center $c_p$ and pupil radius $r_p$ (FIG. 7(f)). Further, an approximate iris radius $r_a$ is considered as a reference radius $$r_r = \frac{r_p r_a}{2}$$

(FIG. 1(g)). Further, an inversion transformation is applied to the pixels lying in the iris-sclera region (FIG. 7(h)) followed by the median filter (FIG. 7(i)). Further, the morphological boundary extraction algorithms are applied again to get boundary pixels (FIG. 7(j)) and cleared to get (FIG. 7(k)). Further, the CHT method is applied to the boundary pixels of (FIG. 7(k)) to get the circular boundary (FIG. 7(l)). Further, the inversion transformation is again applied on the detected circular boundary (FIG. 7(l)) to get the final circular center $c_i$ and radius $r_i$ for the iris region of E (FIG. 7(m)). Hence, the localized iris portion is FIG. 7(n). Finally, the normalized iris I (FIG. 7(o)) is obtained using Daugman's rubber sheet model.

Further, the system may employ a Periocular preprocessing. In the Periocular preprocessing, a local periocular region is obtained from the ocular eyeball image E. Generally, the ocular eyeball image E is the global periocular region (FIG. 8(a)). The periocular biometric plays as a trade-off between the face and iris region, so, to increase the performance of the recognition system the local periocular region is extracted using the above iris localization estimated parameters ($c_p, r_p, c_i, r_i$) (FIG. 8(b)) to get the local periocular region P (FIG. 8(c)).

Further, the system may employ deep learning approaches for feature representation with classification. Further, the images extracted from the iris preprocessing are the region of interest that undergo the feature computation task in the deep learning approaches for feature representation with classification. The normalized iris patterns from the eyeball images are considered for feature computation. The preprocessed images from each biometric trait may be considered textures. The patterns in these textures contain tones in either regular or irregular patterns. These patterns are described in terms of bumpy, smooth, silky, rough, and ridges characteristics. The texture characteristics are analyzed during feature computation. The preprocessed image extracts more discriminant and disjunctive features to overcome the situation when images suffer from poor image quality from various noise artifacts, inter-intra similarity or dissimilarity problems, and closed and open set recognition problems. The extraction of features from processed biometric traits is a crucial task. Since each iris biometric trait is rich in texture information, extracting useful and distinctive texture information is one of the challenging tasks. Further, after the image preprocessing task, the regions of interest are extracted from each corresponding iris biometric trait, and then features are extracted. Further, during recognition, the feature representation task is performed, and then features in the feature vector corresponding to each input image are computed. There are several methods of hand-crafted features, such as transformed, structural, and statistical-based features. Further, the deep learning approaches for the feature representation with classification use a complex CNN architecture that has two components (feature extraction and classification). The design and development of the CNN architecture are based on deep image perturbation layers. Each architecture layer is considered a block and composed of essential layers such as the convolutional layer, activation, batch-normalization, and max-pooling layer. The architecture performs convolution operations using the Rectified Linear Units (ReLU) activation function followed by batch normalization and max-pooling operations for feature extraction. Further, some flattened layers, which are fully connected, are then used for classification tasks on the extracted feature maps from the top of the layers. The performance of the CNN architecture increases based on adding advanced techniques like transfer learning, fine-tuning, and feature-level fusions. The addition of advanced techniques helps the model (CNN architecture) to prevent its learning from over-fitting and imbalanced data problems and increase its performance. Further, the advantages of image augmentation, batch normalization, activation function, and regularization methods significantly impact the performance of the recognition system. Further, the CNN architecture includes:

Convolution: This layer is the core building block of the CNN model. This layer performs most of the computation operations. Further, the Convolution is a linear matrix operation consisting of some kernels or filters $W_{t \times t}$. The kernel is a small-size matrix of weights that slides over the input image and performs element-wise matrix multiplication. Convolution operation essentially performs dot products between some sets of learnable filters $W_{t \times t}$ and local regions of the input image $F_{n \times n}$ and produces an output matrix of dimension $$n' \times n', n' = \frac{n - t^2 \times P}{S} 1$$

where S is the stride that governs a number of cells the filter moves to the right and down from top-left corner to the bottom-right corner in the input image to calculate the next cell in the result and P is the padding that shrinks the height and width of the volumes. The benefits of this layer are: (i) Parameter or Weight Sharing: a feature detector that is used in one part and transferred into other parts of the image. (ii) It reduces the number of effective parameters and image translation. (iii) The sparsity of Connections, i.e., hidden layers of input and output dependencies.

Max-pooling: This layer performs pixel-wise average or median operations to reduce the input image size by half.

The advantages of pooling operation are removing noise, correcting images, and overcoming incidental occlusions. This pooling layer speeds up the process and makes some of the features it detects more robust. Among several pooling layers, such as average pooling, fractional max-pooling, and max pooling, max pooling is a commonly used pooling operation. It calculates the maximum value in each 2×2 feature map and creates a downsampled of the feature maps. It is usually used after a convolutional layer. The primary benefits of this layer are: (i) improved accuracy, (ii) faster matching, (iii) overfitting problems, and (iii) reduced computational costs.

Fully Connected Layers: The connected layers and the convolutional layers are distinct. Further, the CNN model uses two fully connected layers denoted as $FC_1$ & $FC_2$. Here, $n_2$ neurons in $FC_2$ have full connections to all activation $n_1$ in $FC_1$. The activation function can be computed with a matrix multiplication followed by a bias offset. Let $x \in R^{n_1 \times 1}$ represents the single output vector of layer $FC_1$ and $W \in R^{n_1 \times n_2}$ denote the weight matrix of the $FC_2$. Suppose $w_i$ is the weight vector of the corresponding $i_{th}$ neuron of the column vector of W in layer $FC_2$. Then, the output of $FC_2$ is obtained by $W^T x$. The output of fully connected layers is independent of the input image size. The fully connected layer of the CNN architecture reduces the full image size and computes the single vector of class scores, and produces a resulting vector of size $1 \times 1 \times C_i$.

Dense Layers: The dense layer is a fully connected connection layer in a deep neural network. All input layers are connected to the output layers by weight in the dense layer. It performs linear operations with $X_{inputs}$ parameters and generates $X_{output}$ parameters that are also connected to the next layer as inputs. It utilizes dense connections between layers with matching feature map size $X'_i = g'(W^T X'_{i-1})$, where $g'$ is the activation function like ReLU defined as $px = \max(0, x)$.

Batch Normalization: Batch is used to normalize the inputs of the previous layers at each batch, keeping the values in a close range with the mean equal to 0 and standard deviation equal to 1. This prevents the CNN model from being a skewed model at any particular point and increases the computation speed. Further, batch normalization is applied after every convolution layer and then values are passed to the ReLU activation function. Batch Normalization acts as a regularizer and allows the model to use higher learning rates. It is used in various image classification problems and achieves higher accuracy with fewer training steps. Batch Normalization also benefits the gradient flow through the network by reducing the gradients' dependence on the parameters' scale or initial values. It also regularizes the model and reduces the need for dropout layers.

Regularization: Regularization strategies are designed to reduce the test error of a machine learning algorithm, possibly at the expense of training error. The regularization methods in deep learning include dropout, R1-regularization, discriminative regularization, etc. Further, the dropout regularization technique is employed on the penultimate layer $\alpha = [a_1, a_2, \ldots, a_F]$ (F are the numbers of filters) for the CNN model with constrain: $l_2$-norms of the weight vector. The dropout regularization technique drops a unit with a specified probability during training. Dropout prevents co-adaptation of the network's hidden units by randomly dropping out a portion or setting zero of the hidden units during forwarding & backward propagation. The advantage of dropout is that it prevents artificial neural networks from over-fitting.

Optimization: The FERS problem is solved by optimizing the CNN models using Stochastic Optimization methods to optimize. Further, the first-order gradient-based adam optimizer of the stochastic objective function is used for the optimizing of the CNN models. The optimization methods for solving FERS problems are Adagard, SGD, RMSProp, SGD with momentum, AggMo, Demon, Demon CM, DFA, and Adadelta optimization. They use their stochastic mini-bath method. It estimates the learning rate based on lower-order momentum. Adam uses only the first two moments of gradient $\tilde{v}_t$ and the learning rate or step size 'Adam' can handle non-stationary objective functions as in RMSProp while overcoming the sparse gradient issues drawback that appears in RMSProp. 'Adam' is favorable compared to other stochastic optimizers. The implementation of 'Adam' is straightforward and computationally efficient, requiring less memory.

Figure 9:
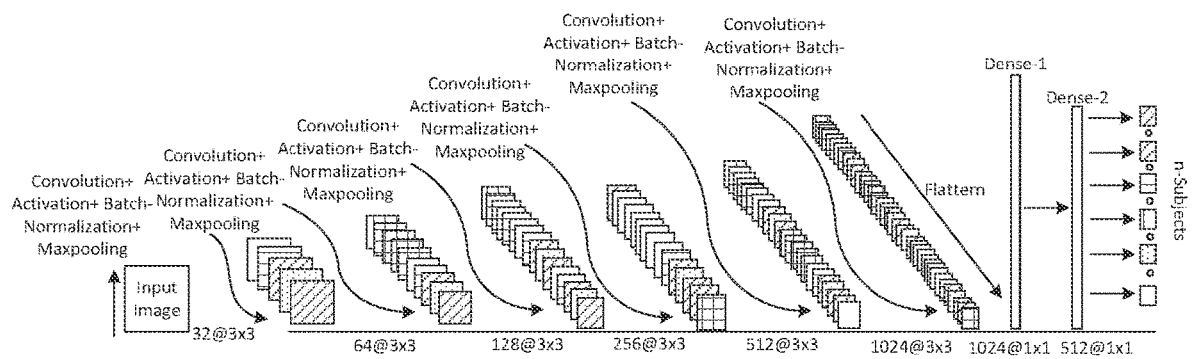
FIG. 9 illustrates a convolutional neural network (CNN) architecture, in accordance with some embodiments.
Figure 11:
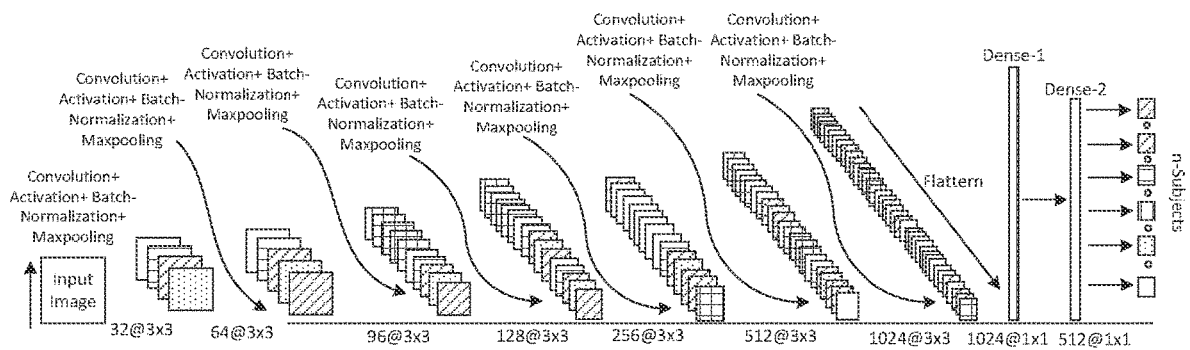
FIG. 11 illustrates a convolutional neural network (CNN) architecture, in accordance with some embodiments.

Further, an input image $F_{n \times n \times r}$ is selected and convolved with a set of filters known as kernels of size ($t_1 \times t_1$). Here, the mechanism of these hidden convolutional layers is known as feature function or mapping. The feature maps are stacked with fixed-size kernels to provide multiple filters on the input. Further, the (3×3) filter's size having stride one for each hidden convolution layer is employed. Further, the Rectified Linear Unit ReLU activation function for each hidden convolution layer is employed. Two convolutional neural network architectures using these layers are used: $CNN_1$ and $CNN_2$. The computational complexity of these $CNN_1$ and $CNN_2$ architectures has been reduced by using $d_1 \times d_1$ pooling layers, which reduces the output size from one layer to the next input hidden layers. Further, (2×2) max-pooling operation to preserve the most significant features and select maximum elements is employed. Here, these images are downsampled to half of their original input size. The maps are flattened into one column to feed the pooled output from the stacked featured map to the final layer. The final layers are comprised of two fully dense connected layers with N number of hidden nodes each. These two flattened layers are regularized using the dropout regularization technique. Finally, the Softmax layer is employed, followed by two connective fully connected layers, and the number of nodes in this layer is equal to the number of emotion expression classes. The detailed description of the CNN models with the employed input image size, generated parameters at each input-output hidden layer, convolution layer, max-pooling layers, batch normalization, activation, and dropout layers have been described in the tables shown in FIGS. 10, 12A, and 12B. The architectural diagrams of the CNNs are depicted in FIGS. 9 and 11.

Further, the CNN architectures use a transfer learning technique in which the weights of the pre-trained model and a set of layers from the pre-trained model $CNN_1$ are used for the new model $CNN_2$ to solve similar problems Further, the biometric recognition system uses two fusion techniques: (i) pre-processing and (ii) post-processing. In the pre-processing, the features extracted from two different feature representation schemes applied to the same biometric traits can also be concatenated (says $PreFusion_1$) to obtain the recognition system's performance. In contrast, the features extracted using the different modalities (of sources) are concatenated and then used to train and test the classifiers (says $PreFusion_2$). The first approach ($PreFusion_1$) relates to feature representation from multi-instances of the same biometric trait. In contrast, the second approach ($PreFusion_1$) is the feature representation from multimodal biometric traits (e.g., left and right Iris biometric here). Both these approaches are under feature-level fusion schemes and have been performed before classification. Assuming that L and R be left, and right Iris images of a person, $F_1$, and $F_2$ be the features generator model corresponding to $CNN_1$ and $CNN_2$ models, respectively. So, the feature representations and classifications due to $PreFusion_1$ and $PreFusion_2$ techniques are defined in Eq. (1) to (4).

$\alpha \leftarrow F_1 CNN_1, L$ $\beta \leftarrow F_1 CNN_1, R$ $\gamma \leftarrow F_2 CNN_2, L$ $\delta \leftarrow F_2 CNN_2, L$ $PreFusion_1 : \emptyset = c_{MI} <\alpha, \gamma>$  (1)

$\Psi = c_{MI} <\beta, \delta>$  (2)

$PreFusion_2 : \emptyset = c_{MI} <\alpha, \beta>$  (3)

$\Psi = c_{MM} <\gamma, \delta>$  (4)

Where $\alpha$ and $\beta$ be the feature vectors generated using the $F_1$ feature generator model concerning left L and right R Iris images, similarly, $\gamma$ and $\delta$ be the feature vectors obtained using the $F_2$ model corresponding to L and R Iris images. $<\alpha, \delta>$ be the concatenation of feature vectors from L Iris that undergoes for classification task to the multi-instance classifier ($c_{MI}$) that obtains $\emptyset$ classification performance for the multi-instance Iris recognition system (PRS). Again, $<\beta, \delta>$ is the concatenation of feature vectors from R Iris that undergoes for classification task to the multimodel classifier ($c_{MM}$) that obtains $\Psi$ classification performance for multimodal PRS. Apart from this, the post-classification fusions relate to the fusion of scores obtained from the trained models due to different modalities (PostFusion$_1$) or different classifiers (PostFusion$_2$). So, the classification fusions due to PostFusion$_1$ and PostFusion$_2$ techniques are defined in Eq. (5) to (8). Here, $S_1$, and $S_2$ be the classification score generators corresponding to $CNN_1$, and $CNN_2$ models. Now, $\lambda, \mu, \rho, \pi$, be the classification scores generated using $S_1$, and $S_2$ from $CNN_1$, and $CNN_2$ for L and R Iris images respectively. These scores are fused using score fusion methods (SFM) such that $a_1$ and $a_2$ be the fused performance of multi-instance PRS, while $b_1$ and $b_2$ be the fused performance derived for multimodal PRS. Here for SFM, the sum-rule, product rule, and weighted-sum rule are employed for score fusion purposes. These fusion methods are defined in Eq. (9), (10), (11), where $z_1$ and $z_2$ be the classification scores obtained in either post-multi-instance PRS or post-multimodal PRS, and $\omega_1$ and $\omega_2$ be the weights assigned to the classifiers.

$\lambda \leftarrow SCNN_2, L, \mu \leftarrow SCNN_1, R$ $\rho \leftarrow SCNN_2, L, \pi \leftarrow SCNN_2 L$ $PostFusion_1 : \alpha_a = SFM\alpha, \gamma$  (5)

$\alpha_1 = SFM\beta, \delta$  (6)

$PostFusion_2 : b_1 = SFM\alpha, \gamma$  (7)

$b_2 = SFM\beta, \delta$  (8)

SFM : Score Fusion Methods

Sum-rule: $z = z_1 z_2$  (9)

Product-rule: $z_1 * z_2$  (10)

Weighted-Sum-rule: $\omega_1 * z_1 \omega_2 z_2$  (11)

$\omega_1 \omega_2 = 1$

During PreFusion1 and PreFusion2, the feature level fusion has been performed where the features are extracted corresponding to a biometric (Iris/Periocular) from each trained model. Then features are concatenated to form a single feature vector. These feature vectors are extracted for the proposed recognition system's training and testing sets of biometric images. In this work, the employed feature level fusions (FLF) and classifier design have been demonstrated in FIG. 13.

Further, the system employs key generation. In the key generation, the feature vectors extracted from the deep learning architectures undergo computing a key generation from each feature vector ($f_1$ or $f_P$). Let $f_1$ contains m elements ($a_1, a_2, \ldots, a_m$) and out of m elements n are unique, i.e., $b=(b_1, b_2, \ldots b_n)$. If m=n, that means all elements of $f_1$ are distinct while m^n means few elements are redundant. Then, the distribution of n elements in terms of probabilities $z=z_1, z_2, \ldots, z_n$, are computed, i.e., $z_i=P(b=bi)$, i$\in$ (1, ..., n), and P be the probability of $b_i$ in b. Then based on these probabilities, a binary tree has been constructed. The construction of this binary tree is as follows: The calculated n probabilities (z) are arranged in increasing order to form z'. Select the two least probability values from z', and then construct a subtree where its left child element <right child element and the sum of (left+right) child element will be a parent node. Then in the next sequence, the computed parent node is inserted into the remaining (n−2) z' probability values. Again, perform sorting and update z' with (n−1) probability values. Now select the two least values and construct the subtree where the parent node of the previous tree will be at either left or right child depending upon the left≤right child element at the next subtree. Repeat the process until all the probability values will form the complete binary tree. After completing the binary tree, a value '0' is assigned to the left and '1' to the right child of each parent node of the complete binary tree (shown in FIG. 14). Now the pre-order binary tree traversal has been performed to each leaf node such that codewords $c=(c_1, c_2, \ldots, c_n)$ are generated, $c_i$ be the codeword for bi. For these, an example of a Huffman binary tree using seven heights is demonstrated in FIG. 14.

Here, the code-words formation process where $v_1, v_2, \ldots v_8$ are the distinct values for the leaf nodes and a, b, c, d, e, f, g are the internal nodes. The non-increasing order of the elements of leaf nodes is $v_1 \leq v_2 \leq v_3 \leq v_4 \leq v_5 \leq v_6 \leq v_7 \leq v_8$. The symbol $w(v_i)$ means the code-word for $v_i$. The value of f is the sum of probabilities of $v_1$ and $v_2$ i.e., $P(f)=P(v_1)+P(v_2)$. Similarly, $P(g)=P(v3)+P(v4)$, $P(e)=P(f)+P(g)$, $P(d)=P(e)+P(v5)$, $P(c)=P(v6)+P(d)$, $P(b)=P(c)+P(v7)$, and $P(a)=P(v8)+P(b)$.

Figure 15:
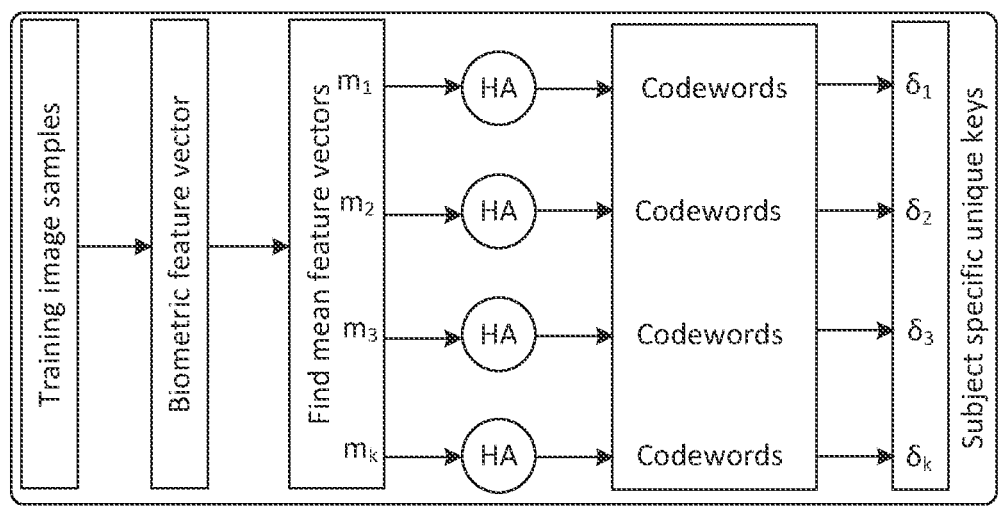
FIG. 15 illustrates a flow diagram of a Huffman algorithm for a key generation process, in accordance with some embodiments.

Here, we generated keys using the training samples from each subject. A feature vector is extracted from each sample, and the mean feature vector is computed for each subject. On these mean feature vectors, the Huffman algorithm is applied to create codewords $w=(w_1, w_2, \ldots, w_n)$ which is further transformed into equivalent decimal numbers i.e., $(w\hat{}_2=(d\hat{}_{10})$. Finally, these decimal numbers are concatenated to generate a strong Bio-Key ($\delta$) i.e., $\delta=[w_1 \| w_2 \| \ldots w_n]$ ($\|$ refers to the concatenation operator) which is used as the user specific key for wherever required. FIG. 15 shows the key generation process of the system.

Further, the system may employ cancelable biometrics. Further, the key generation process is applied for generating cancelable templates from the original biometric features. So, the training feature samples from each subject are considered for the key generation process. Then the computed mean feature vector corresponding to each subject is derived. The Huffman algorithm has been applied to this mean feature vector of each subject to generate the codeword ($c_1, c_2, \ldots, c_n$) described in the key generation process, and these are transformed into equivalent decimal numbers i.e., $(c_i)_2=(d_i)_{10}$. Finally, these decimal values are added to obtain $$\rho = \sum_{i=1}^{n}(d_i).$$

This $\rho$ is used as a user-specific token during BioHashing. FIG. 15 shows the key generation steps.

Further, the BioHashing (shown in Eq. (13)) improves the security and performance of the recognition system. The BioHashing technique aims to generate cancelable feature biometrics that can be used for identification and verification purposes. Here, three level BioHashing approach is employed where in the first level, a user token-based random matrix R is normalized by the Gram-Schmidt orthogonalization method. Then projection operation has been applied between the original Iris feature vector and the normalized random matrix R. This projection generates a BioHashed feature vector B' which is further scaled to $$\xrightarrow{\delta} B' \xrightarrow{\{0,1\}} b_{B'}.$$

$$B \odot R \xrightarrow{\delta} B' \xrightarrow{\{0,1\}} b_{B'}. \quad (12)$$

This bit vector $b_B=[b_1, b_2, \ldots b_m] \in \{0,1\}$ is used only for verification purposes and is not secure enough because the attacker can apply the reverse process to get back B from $b_B'$ and for this reverse operation time complexity is O(m) (where m is the dimension of the feature vector I). Hence, Eq. (12) to Eq. (13) applying two successive random permutations using two different subject specific tokens $t_1$ and $t_2$. In the first step, cancelable feature vector $B'^{1 \times m}$ is randomly permuted using random permutation function $\pi$ with token $t_1=\delta+t_s$ ($\delta$ is user-specific and is is system specific token) which generates B". In the second step, cancelable feature vector $B''^{1 \times m}$ is randomly permuted using random permutation function n with token $t_2=t_1+t_s$ which generates B'''. This B''' is further scaled to $\{0, \ldots, 1023\}$ which generates final cancelable vector $C_B \in R^{1 \times m}$ and used for both identification and verification purposes. The reason behind scaling the feature vector B''' to the range $\{0, \ldots, 1023\}$ is that a wider range of values yields more unique values in a feature vector. It experiments that for a 500-dimensional feature vector if the features are scaled in the range $\{0, \ldots, 1023\}$ then there is a possibility to obtain 50% unique values, whereas if the same feature vector is scaled to the range $\{0, \ldots, 1023\}$ then there is a possibility to obtain approximately 100% unique values. This $C_B \in R^{1 \times m}$ is more secure than $b_B'$ and gives better performance. If $C_B$ is compromised then the predictions of B from $C_B$ via B''', B", and B' is almost impossible. Applying the n function on B' and B" successively increases performance and security. Moreover, $C_B$ is more discriminant than B'''. The enhanced BioHashing method has been represented in Eq. (13).

$$B \odot R \xrightarrow{\delta} B' \xrightarrow{\pi_{t1}(B')} B'' \xrightarrow{\pi_{t2}(B'')} B''' \xrightarrow{\{0,1023\}} C_B \quad (13)$$

The generated cancelable biometrics satisfies the four necessary and sufficient criteria of the cancelable biometrics such as (1) Irreversibility of cancelable biometrics: the generated cancelable biometrics are irreversible since it is not possible to regenerate the original biometrics from the cancelable biometrics, (2) Reusability of original biometrics: by changing the parameters used during feature transformation cancelable biometrics can be regenerated from original biometrics, (3) Unlinkability: it means cross-matching with other similar biometric applications. Cancellable biometrics are employed to generate a vault using a fuzzy vault algorithm based on user and system tokens. The vault is used for user authentication in online mode. Since the vault is dependent on multiple tokens, there is no possibility of cross-matching with other biometric applications over the networks, (4) Performance preservation: the cancelable biometrics retains the performance of the original iris biometrics. Hence, the proposed feature transformation technique holds performance preservation property. Further, the system includes Bio-Cryptosystem. Further, in the Bio-Cryptosystem a fuzzy vault is employed. Further, the fuzzy vault is a method that strengthens conventional cryptographic security systems by incorporating biometric authentication to get over the security flaw in cryptographic key storage. For standalone security and authentication devices in the form of system-on-chip (SoC), bio-metric encryption solutions based on fuzzy vault techniques are suitable for SoC. The chaff generation creates noise (chaff) points that conceal the true points inside the vault template. Further, the chaff generation used in the system is computationally quick and suitable for hardware acceleration. According to the complexity analysis, the algorithm's complexity is On2.

Further, the present disclosure describes a deep secure iris recognition system. Further, the deep secure iris recognition system: (i) incorporates multi-algorithm, multi-biometric, and multi-instance concepts for person authentication or recognition, (ii) uses schemes to enhance the performance of the recognition systems by accepting several challenging issues of unconstrained environments for image acquisitions, (iii) extracts more discriminant and distinctive features from several intermediate deep features that facilitates the high generalization capability of distinguishing patterns in the biometric traits, (iv) incorporates several feature-level fusions schemes that enhance the securities, irrevocability, and non-transferability of extracted biometric features preserving them from external attacks and misuse, (v) includes a user biometric-based strong and robust key generation scheme, (vi) includes modified cancelable biometric system for enhancing the biometric information from external attacks and misuse, and the modified cancelable biometric system is based on the user's password/key that need not to remember by the user, (vii) includes a token-based 'vault' using fuzzy logic techniques that makes the authentication system faster and independent.

Further, the present disclosure describes an implementation of the iris recognition system. Further, two eyeball iris image databases are used for the implementation. For Iris biometric, the performance of the system using two benchmark databases, namely 'CASIA-V4-distance' and 'UBIRIS.$v_2$' is evaluated. Further, the CASIA-V4-distance database has 138 subjects, and each subject has eight left and right eyeball image samples. In contrast, the UBIRIS.$v_2$ database has 211 subjects, and each subject has eight left and right eyeball image samples. The images of the CASIA-V4-distance database are captured under NIR light in unconstrained environments. The UBIRIS.$v_2$ image samples are captured in visible (VW) lighting and an unconstrained environment. Some eyeball image samples from UBIRIS.$v_2$ and CASIA-DISTANCE databases have been shown in FIGS. 17 and 18 respectively, and the table shown in FIG. 19 demonstrates the description of the databases.

Further, the implementation of the system is carried out using a computing device having (NVIDIA 4 GB GPU with 32 GB RAM and Intel core i7 processor). The system is based on both periocular and iris biometric traits. Further, a preprocessing technique is employed for the eyeball image, and iris and periocular biometrics are extracted based on the preprocessing. Further, feature representation schemes are used to perform feature extraction and classification tasks. During iris preprocessing, a rectangular box of 100×360 normalized iris pattern has been segmented from each eyeball image. Further, the obtained parameters, center, and radius Cp, rp of the pupil and Ci, ri of iris regions from preprocessing step, are used to extract the local periocular region from each eyeball image. Further, local periocular and iris patterns are treated as two biometrics, and the feature representation schemes are employed individually.

Further, the system includes Deep learning schemes. Further, the deep learning scheme includes two convolutional neural network architectures: $CNN_1$, and $CNN_2$, where the size of the input biometric is 192×192×3 for $CNN_1$, and 256×256×3 for $CNN_2$. The configuration of the CNN architectures is fixed to these image sizes. Further, the implementation includes the training of $CNN_1$ architectures by maintaining several factors that affect the performance of the system.

Figure 20:
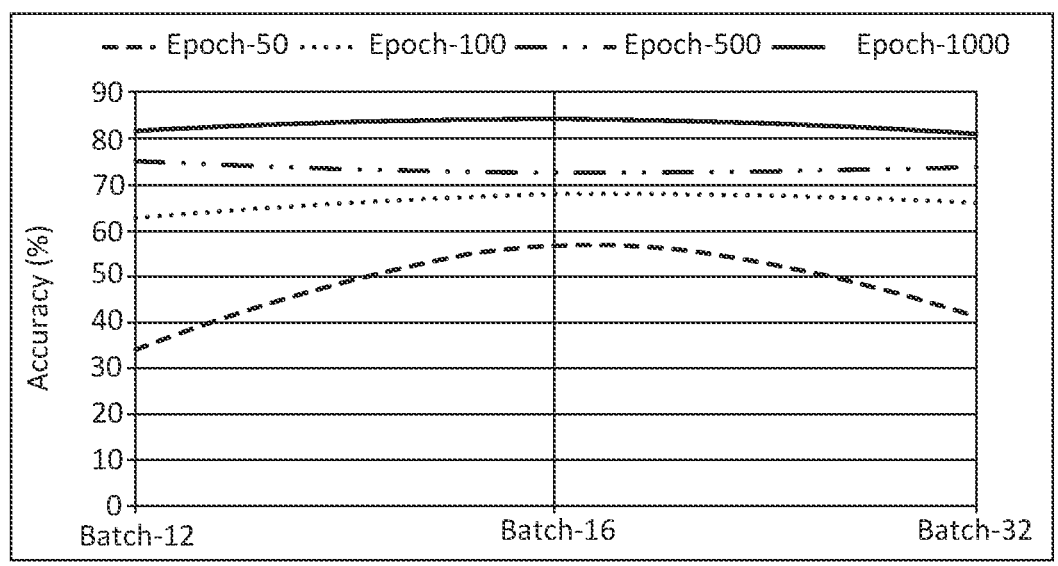
FIG. 20 illustrates a graph of a performance of a system for facilitating biometric recognition, in accordance with some embodiments.
Figure 21:
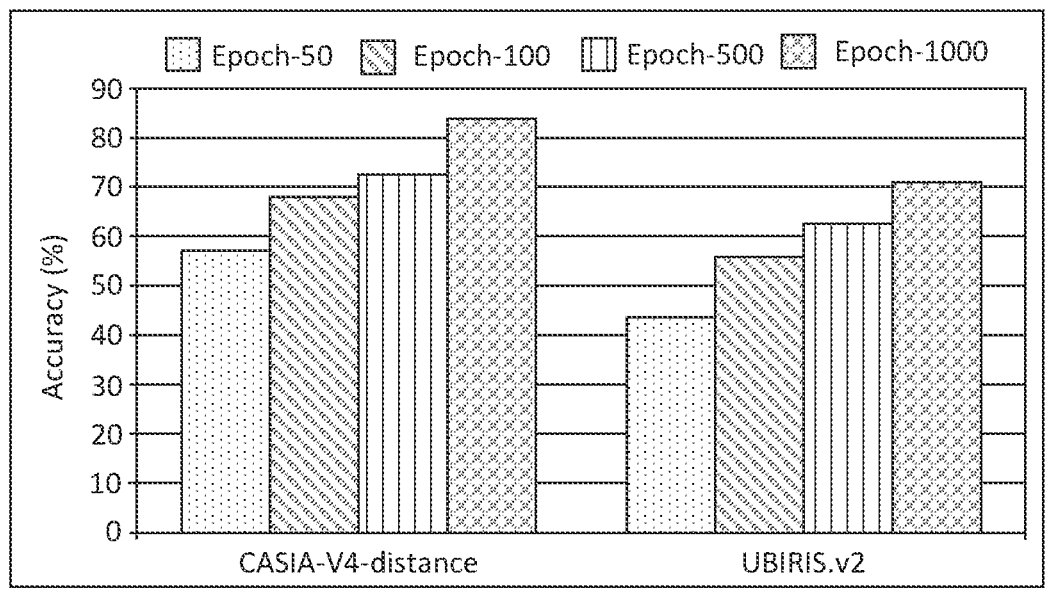
FIG. 21 illustrates a graph of a performance of a system for facilitating biometric recognition, in accordance with some embodiments.

Further, the implementation of the system includes batch vs epoch effect analysis. Further, the batch vs epoch effect analysis is crucial in determining the learning weight parameters of CNN models. Further, the implementation includes the performance evaluation of the $CNN_1$ model that takes 192×192 sized normalized iris pattern input corresponding to the batch and the epoch. The performance evaluation with the adjustment of epoch and batch is shown in FIG. 20. Further, an improvement in the performance with increasing epochs from 100 to 1000 with varying batch sizes of 12, 16, and 32 is evident in FIG. 20. Further, the performance increases with the varied size of epochs and a fixed size of 16 batches for both datasets. As shown in FIG. 21, the performance is better in the range of 500 to 1000 epochs by fixing the batch size as 16.

Further, the implementation of the system includes employing fine tuning and transfer learning. Further, the fine tuning and transfer learning may be employed for training the CNN architectures ($CNN_1$ and $CNN_2$). Further, the fine tuning and transfer learning through two approaches. The first approach is to train the hyperparameters, which can be performed individually for both $CNN_1$ and $CNN_2$ from the start. In the second approach, the trained $CNN_1$ model is employed for $CNN_2$, such that only the upper layers are trained while the lower layers are frozen for untraining. The effect of employing the fine-tuning and transfer-learning approaches is demonstrated in FIG. 22, which shows an increase in performance for the first approach than the second approach. Further, the first approach of the fine tuning and transfer learning is employed for the training of the CNN architectures ($CNN_1$ and $CNN_2$).

Further, the implementation of the system includes multi-resolution image analysis. Further, the multi-resolution image analysis is performed by providing the $CNN_1$ and $CNN_2$ architectures with two different image sizes, such as 192×192×3 and 256×256×3. During preprocessing, 100× 360×3 normalized iris pattern, and 200×200×3 periocular region are extracted from each eyeball image. Further, these images are down-sampled to 192×192×3 and 256×256×3 images, for $CNN_1$ and $CNN_2$ architectures respectively. Further, the multi-resolution image analysis is used so that (i) CNN networks are trained with lower to higher resolution of images and (ii) the hierarchical abstraction of feature representations with better discrimination of texture patterns can be obtained corresponding to each image. The performance of multi-resolution image analysis for the system (iris recognition system) is demonstrated in the table shown in FIG. 23. Here, the results for CASIA-V4-distance and UBIRIS.$v_2$ databases are shown individually for the left and right iris biometrics. From the table (as shown in FIG. 23), it is clear that the performance of the system is increased due to progressive image resizing.

Figure 13:
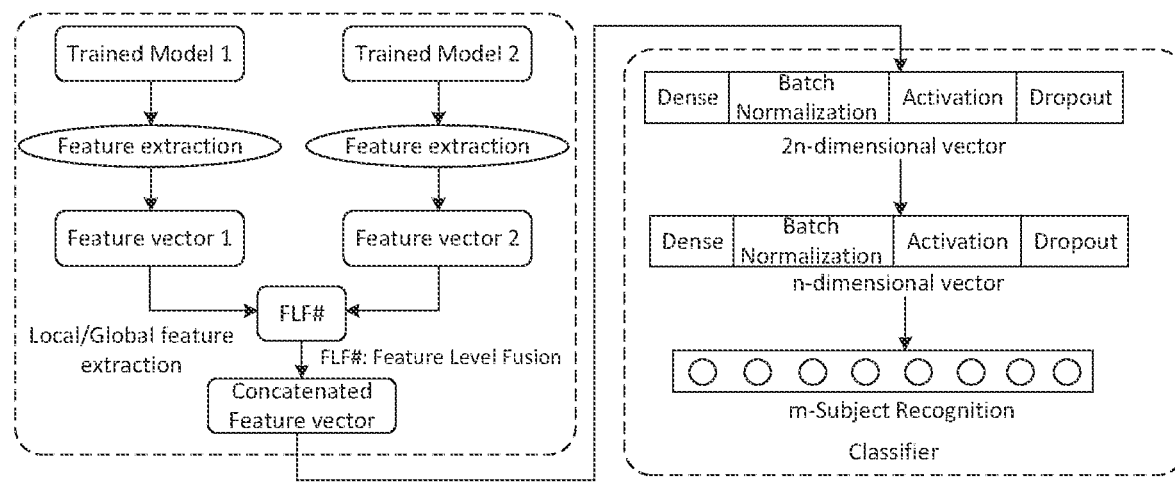
FIG. 13 is a block diagram of a system for facilitating biometric recognition, in accordance with some embodiments.

Further, the implementation of the system includes experimenting with Multi-algorithm Biometrics. The performances reported in the table shown in FIG. 23, are fused using PreFusion1 and PreFusion2 defined in Eq. (1) to (4) which means that the features are extracted from some level of $CNN_1$ and $CNN_2$ corresponding to each biometric and concatenated to form a feature vector as feature representation for that biometric. Further, the classification part of the CNN architecture ($CNN_1$ or $CNN_2$) is used for training and testing purposes of that biometric trait (FIG. 13). Since the features extracted from two CNN architectures from each biometric trait are different and have different discriminant powers to distinguish the patterns, this is considered for the multi-algorithm biometrics. The performance of the system due to the multi-algorithm of biometrics for iris and periocular recognition systems is reported in the table shown in FIG. 24. From this table (as shown in FIG. 24), it is observed that for CASIA-V4-distance, the performance for the left iris is 94.68%, 95.91% for the right iris, 99.65% for the left periocular, and 99.89% for the right periocular due to feature level fusion (FLF) techniques. Similarly, for the UBIRIS.$v_2$ database, the performance is higher for periocular biometrics than iris biometrics.

Further, the implementation of the system includes experimenting with Multi-Biometrics system. The features obtained from the multi-algorithm Biometrics mentioned in the table shown in FIG. 24, are used to build the multi-biometric systems. Further, the fused features of the iris are concatenated with the fused features of the periocular. The fusions are performed (i) to incorporate multiple biometric trait features together, (ii) to employ the facilities of multiple traits from the single source of eyeball image, and (iii) to incorporate together the local features from normalized iris and global features from periocular images. The performance of the system due to multi-biometric schemes have been shown in the table shown in FIG. 25. From this table (as shown in FIG. 25), it is clear that corresponding performance due to iris and periocular, the Pre-Fusion (FLF), obtains outstanding performance concerning each left or right eyeball image of the employed databases.

Further, the implementation of the system includes experimenting with Multi-instance Biometrics. The features obtained from the multi-biometric systems mentioned in the table shown in FIG. 25, are fused because the same person's left and right eyeball images are used to obtain the performance for multi-instance biometric systems. Here the fused features of the Iris and Periocular of the left eyeball image are fused with the fused features of the iris and periocular of the right eyeball images. Then, both feature level fusion (Eq. (1) to Eq. (4)) and score level fusion (Eq. (9) to Eq. (11)) techniques are employed to build the multi-instance biometric systems. The system is employed (i) to increase the performance of the recognition systems and (ii) the performance obtained for this system is finally used to obtain the final decision for the authentication system. The performance of the proposed system due to the multi-instance biometric systems is reported in the table shown in FIG. 26. From this table (as shown in FIG. 26), it is clear that the performance increases due to the pre-classification fusion level technique. Further, the fused features of the Iris and Periocular of the left or right eyeball image are used to build the system (deep secure iris recognition) for person recognition.

Further, the implementation of the system includes experimenting with cancelable biometrics. Further, the performance is obtained for both iris and periocular recognition systems using cancelable biometric systems CBS1 (scheme Eq. (13)) and CBS2 (scheme Eq. (14)). The performance due to iris and periocular cancelable biometric systems are reported in the table shown in FIG. 28. From this table (as shown in FIG. 28), it is clear that the performance increases drastically for CBS2 than CBS1. And the CBS1 attains the worst performance. Further, the experimenting concludes that performance increases with only 20-bits at the higher level of security. The performance comparison of the cancelable iris and the periocular systems have been compared with some existing state-of-the-art methods. These comparisons have been reported in the table shown in FIG. 29. Further, the cancelable biometrics are used: (i) to convert the original biometric features into non-invertible transform features; (ii) to preserve the revocability, non-invertibility, performance, and unlinkability properties; (iii) to provide a higher level of security to the original biometric features and preserve these features from external attacks and misuse; (iii) to provide the facilities for replacing the compromised cancelable biometric features with the new ones keeping the original biometric features safe in offline mode.

Further, the implementation of the system includes experimenting with the Bio-Cryptosystem. Further, the system (Bio-Cryptosystem) is based on fuzzy logic, which generates a vault. This vault generation technique is followed by Checksum calculation, polynomial transform, and template integration. The time complexity of the vault generation scheme is shown in the table shown in FIG. 31. The required time (in seconds) for individual enrollment and authentication of the proposed system has been investigated and reported in the table shown in FIG. 30. Here, t1 and t2 are the average preprocessing and average feature extraction time respectively in terms of the number of enrolled subjects, t3 is the total key generation time, t4 is the average time for BioHashing, t5 is the total encryption time and t6 is the total decryption time concerning the employed feature vectors. The enrollment time te=(t1+t2+t3+t4+t5, n=number of image samples) and the authentication time is ta=(t1+t2+t4+t6).

Further, the present disclosure describes a deep learning-based iris recognition system in a secure domain approach. The first implementation step is image preprocessing, where an iris and periocular regions from an eyeball image have been extracted. Then some deep learning-based convolutional neural network architectures have been proposed for feature representation with the classification of iris and periocular biometrics for persons verification and identification in the second step of implementation. To accept several challenging issues concerning image acquisition, inter-intra class similarities or dissimilarities, and enhance the performance of the recognition system, some advanced feature representation techniques like multi-resolution image analysis, fine-tuning, transfer learning, multi-algorithm, multi-biometric, and multi-instance schemes have been introduced at the third step of the implementation. In the fourth step, several feature-level fusions schemes are performed for more discriminant and distinctive features from several intermediate deep features that facilitate the high generalization capability of distinguishing patterns in the biometric traits. In the fifth step, a modified cancelable biometric system and its robust key generation technique have been proposed to preserve the extracted original biometric features from external attacks and misuse. In the sixth step, a token-based 'fuzzy vault' technique has been introduced with cancelable biometrics to a Bio-ID card-based faster and independent authentication system.

Further, the present disclosure describes an eyeball biometric-based recognition system which implements novel methods of feature representation schemes using deep convolutional neural network architectures that exhibit sufficient distinctiveness for inter-class image samples and significant similarity for intra-class image samples with outstanding performance for image samples captured in various lighting conditions and environments.

Further, the present disclosure describes feature representation and classification algorithms that give outstanding performance for the biometric recognition system in unconstrained and uncontrolled lab environments. Here, multi-algorithm schemes use deep learning techniques and extract the discriminant features by analyzing the patterns of the same biometric traits using multi-algorithms. The multi-biometric means both iris and periocular regions are extracted from an eyeball image. Further, the extracted features for the iris pattern are concatenated with the extracted features of the periocular region. The multi-biometric from the same biometric traits are used (i) to employ the facilities of multiple traits from the single source of eyeball image and (iii) to incorporate the local to global feature representation from the single source of the biometric trait. The multi-instance schemes are used (i) to fuse the performance of left and right eyeball images to increase the performance of the recognition systems to obtain the final decision for the authentication system. All these schemes provide higher performance for the iris recognition system and preserve the system from forging or spoofing of the iris impression.

Further, the present disclosure describes feature-level fusions schemes that are incorporated into the system to extract more discriminant and distinctive features from several intermediate deep features that facilitate the high generalization capability of distinguishing patterns in the biometric traits. The use of score-level fusion schemes enhances the securities, irrevocability, and non-transferability of extracted biometric features and provides securities.

Further, the present disclosure describes the system that provides robust and faster authorization for access control systems with the real-time identification system with more secure and less time-consuming factors. For this purpose, Bio-ID card-based technologies have been proposed that use both enhanced cancelable biometrics and modified bio-cryptography techniques to transmit the information through communication links and store the encrypted templates in the database to preserve them from external attacks and misuse.

Further, the present disclosure describes an iris recognition system that may be used in mainstream security locations and environments such as border security, healthcare, financial services, and entertainment venues.

Further, the present disclosure describes a biometric recognition system that may be helpful in both physical and logical security. Its strong authentication capability has the potential for living passport computer login, password cell phone, authentication of rights to services premises access control (home, office, laboratory, etc.), anti-terrorism (e.g., security screening at airports), secure financial transactions (electronic commerce, banking), Internet security; control of access to privileged information.

Further, the present disclosure describes an iris recognition system. Since it is pretty challenging to forge or spoof the iris impression. The iris recognition system is safer and more reliable and ensures greater security against potential fraud.

Further, the present disclosure describes systems and methods for facilitating biometric recognition.

Further, the present disclosure relates generally to the field of image analysis. More specifically, the present disclosure relates to systems and methods for facilitating biometric recognition.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
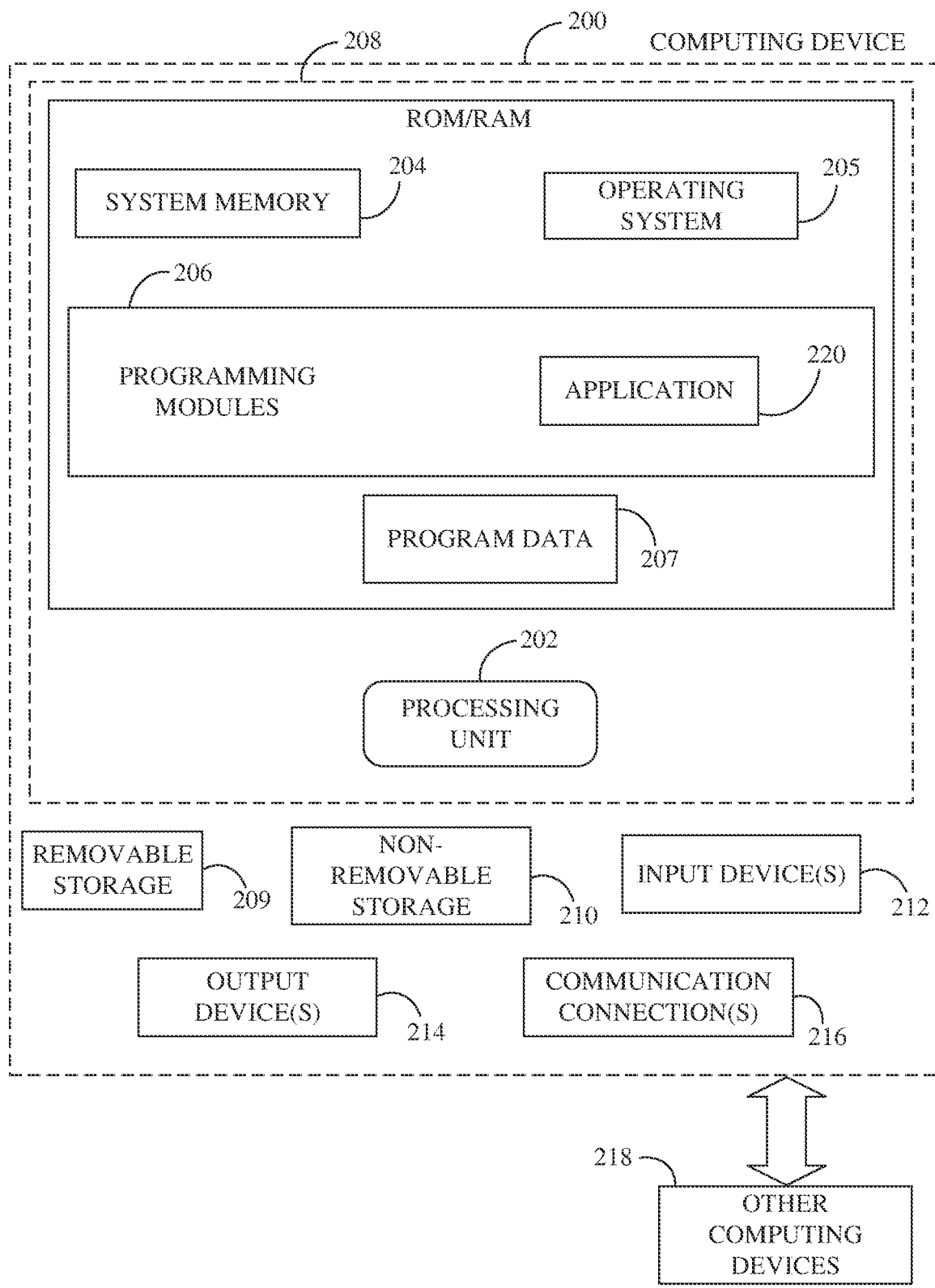
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing modules and machine learning modules. Furthermore, embodiments of the disclosure may be practiced in conjunction with a graphics library, other operating systems, or any other application program and are not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, and databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3A:
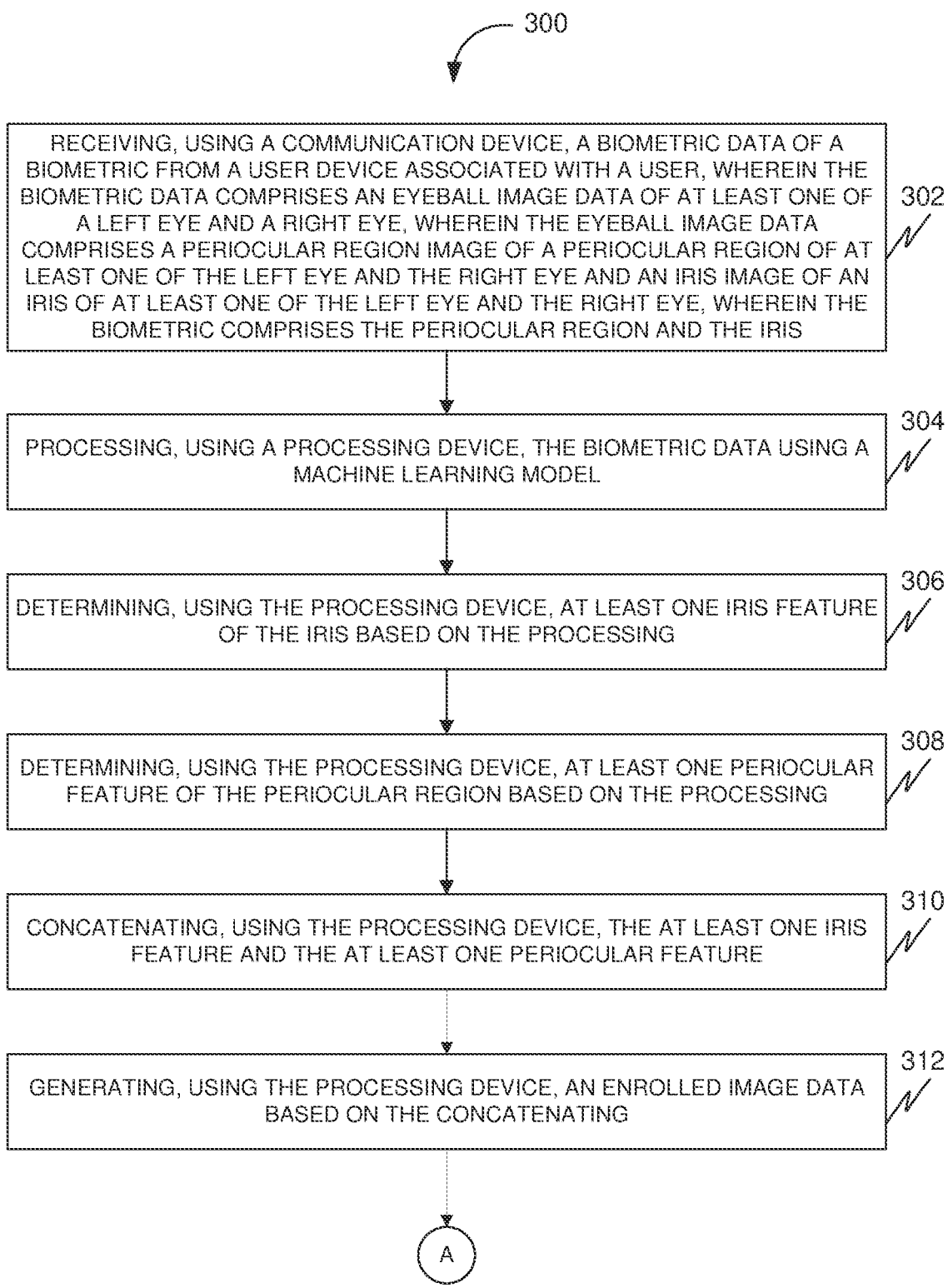
FIG. 3A illustrates a flowchart of a method 300 for facilitating biometric recognition, in accordance with some embodiments.
Figure 3B:
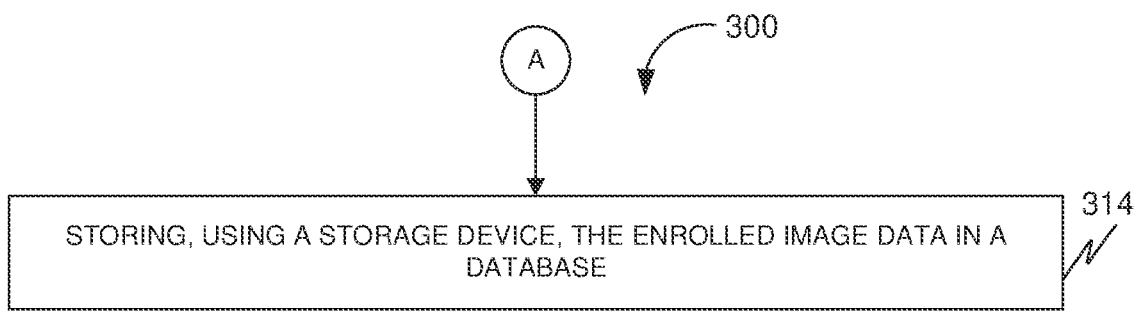
FIG. 3B illustrates a continuation of the flowchart of the method 300 for facilitating biometric recognition, in accordance with some embodiments.

FIGS. 3A and 3B illustrate a flowchart of a method 300 for facilitating biometric recognition, in accordance with some embodiments.

Accordingly, the method 300 may include a step 302 of receiving, using a communication device, a biometric data of a biometric from a user device associated with a user. Further, the biometric data includes an eyeball image data of one or more of a left eye and a right eye. Further, the eyeball image data includes a periocular region image of a periocular region of one or more of the left eye and the right eye and an iris image of an iris of one or more of the left eye and the right eye. Further, the biometric includes the periocular region and the iris. Further, the user device may include a computing device, a client device, etc.

Further, the method 300 may include a step 304 of processing, using a processing device, the biometric data using a machine learning model.

Further, the method 300 may include a step 306 of determining, using the processing device, one or more iris features of the iris based on the processing.

Further, the method 300 may include a step 308 of determining, using the processing device, one or more periocular features of the periocular region based on the processing.

Further, the method 300 may include a step 310 of concatenating, using the processing device, the one or more iris features and the one or more periocular features. Further, the concatenating may include fusing.

Further, the method 300 may include a step 312 of generating, using the processing device, an enrolled image data based on the concatenating. Further, the enrolled image data may be used in biometric recognition (iris recognition).

Further, the method 300 may include a step 314 of storing, using a storage device, the enrolled image data in a database.

In some embodiments, the iris image includes a left iris image of the left eye and a right iris image of the right eye. Further, the periocular region image includes a left periocular region image of the left eye and a right periocular region image of the right eye. Further, the one or more iris features include one or more left iris features corresponding to the left eye and one or more right iris features corresponding to the right eye. Further, the one or more periocular features include one or more left periocular features corresponding to the left eye and one or more right periocular features corresponding to the right eye.

Further, in some embodiments, the processing of the biometric data may include performing an iris preprocessing on the eyeball image data. Further, the processing of the biometric data may include obtaining a normalized iris image based on the performing of the iris preprocessing. Further, the processing of the biometric data may include analyzing the normalized iris image using the machine learning model. Further, the determining of the one or more iris features may be based on the analyzing of the normalized iris image.

Further, in some embodiments, the processing of the biometric data may include performing a periocular preprocessing on the eyeball image data. Further, the processing of the biometric data may include obtaining a local periocular region image based on the performing of the periocular preprocessing. Further, the processing of the biometric data may include analyzing the local periocular region image using the machine learning model. Further, the determining of the one or more periocular features may be based on the analyzing of the local periocular region image. In some embodiments, the machine learning model includes one or more first machine learning models associated with one or more first schemes and one or more second machine learning models associated with one or more second schemes. Further, the analyzing of the normalized iris image includes analyzing the normalized iris image using the one or more first machine learning models and the one or more second machine learning models. Further, the analyzing of the local periocular region image includes analyzing of the local periocular region image using the one or more first machine learning models and the one or more second machine learning models. Further, the determining of the one or more iris features may be based on the analyzing of the normalized iris image using the one or more first machine learning models and the one or more second machine learning models. Further, the determining of the one or more periocular features may be based on the analyzing of the local periocular region image using the one or more first machine learning models and the one or more second machine learning models.

Further, in some embodiments, the determining of the one or more iris features may include determining one or more first iris features corresponding to the one or more first schemes and one or more second iris features corresponding to the one or more second schemes based on the analyzing of the normalized iris image using the one or more first machine learning models and the one or more second machine learning models. Further, the determining of the one or more iris features may include concatenating the one or more first iris features and the one or more second iris features. Further, the determining of the one or more iris features may include obtaining the one or more iris features based on the concatenating of the one or more first iris features and the one or more second iris features.

Further, in some embodiments, the determining of the one or more periocular features may include determining one or more first periocular features corresponding to the one or more first schemes and one or more second periocular features corresponding to the one or more second schemes based on the analyzing of the local periocular region image using the one or more first machine learning models and the one or more second machine learning models. Further, the determining of the one or more periocular features may include concatenating the one or more first periocular features and the one or more second periocular features. Further, the determining of the one or more periocular features may include obtaining the one or more periocular features based on the concatenating of the one or more first periocular features and the one or more second periocular features.

Figure 4:
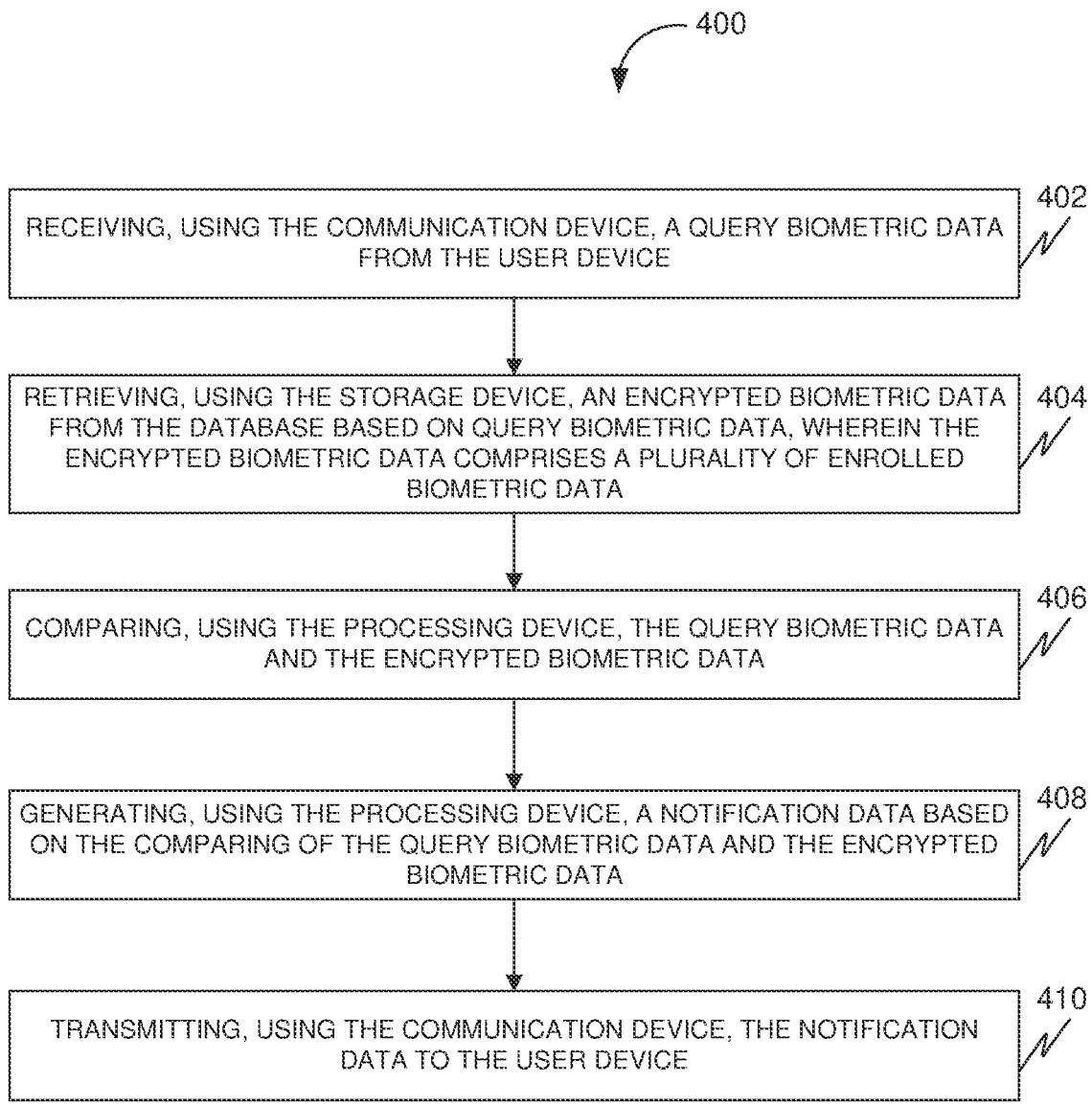
FIG. 4 illustrates a flowchart of a method 400 for facilitating biometric recognition, in accordance with some embodiments.

FIG. 4 illustrates a flowchart of a method 400 for facilitating biometric recognition, in accordance with some embodiments.

Accordingly, the method 400 may include a step 402 of receiving, using a communication device, a query biometric data from a user device associated with a user. Further, the method 400 may include a step 404 of retrieving, using a storage device, an encrypted biometric data from a database based on the query biometric data. Further, the encrypted biometric data may include two or more enrolled biometric data Further, the method 400 may include a step 406 of comparing, using a processing device, the query biometric data and the encrypted biometric data. Further, the method 400 may include a step 408 of generating, using the processing device, a notification data based on the comparing of the query biometric data and the encrypted biometric data. Further, the method 400 may include a step 410 of transmitting, using the communication device, the notification data to the user device.

Figure 5:
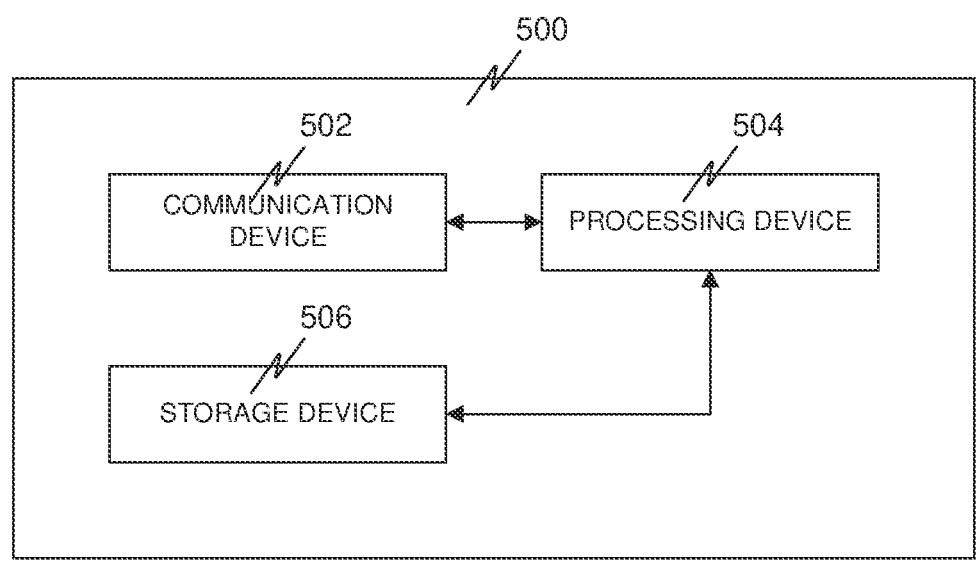
FIG. 5 illustrates a block diagram of a system 500 for facilitating biometric recognition, in accordance with some embodiments.

FIG. 5 illustrates a block diagram of a system 500 for facilitating biometric recognition, in accordance with some embodiments.

Accordingly, the system may include a communication device 502. Further, the communication device 502 may be configured for receiving a biometric data of a biometric from a user device associated with a user. Further, the biometric data includes an eyeball image data of one or more of a left eye and a right eye. Further, the eyeball image data includes a periocular region image of a periocular region of one or more of the left eye and the right eye and an iris image of an iris of one or more of the left eye and the right eye. Further, the biometric includes the periocular region and the iris. Further, the system 500 may include a processing device 504 communicatively coupled with the communication device 502. Further, the processing device 504 may be configured for processing the biometric data using a machine learning model. Further, the processing device 504 may be configured for determining one or more iris features of the iris based on the processing. Further, the processing device 504 may be configured for determining one or more periocular features of the periocular region based on the processing. Further, the processing device 504 may be configured for concatenating the one or more iris features and the one or more periocular features. Further, the processing device 504 may be configured for generating an enrolled image data based on the concatenating. Further, the system 500 may include a storage device 506 communicatively coupled with the processing device 504. Further, the storage device 506 may be configured for storing the enrolled image data in a database.

In some embodiments, the iris image includes a left iris image of the left eye and a right iris image of the right eye. Further, the periocular region image includes a left periocular region image of the left eye and a right periocular region image of the right eye. Further, the one or more iris features include one or more left iris features corresponding to the left eye and one or more right iris features corresponding to the right eye. Further, the one or more periocular features include one or more left periocular features corresponding to the left eye and one or more right periocular features corresponding to the right eye.

Further, in some embodiments, the communication device 502 may be configured for receiving a query biometric data from the user device. Further, the communication device 502 may be configured for transmitting a notification data to the user device. Further, the storage device 506 may be configured for retrieving an encrypted biometric data from the database based on the query biometric data. Further, the encrypted biometric data may include two or more enrolled biometric data. Further, the processing device 504 may be configured for comparing the query biometric data and the encrypted biometric data. Further, the processing device 504 may be configured for generating the notification data based on the comparing of the query biometric data and the encrypted biometric data.

Further, in some embodiments, the processing of the biometric data may include performing an iris preprocessing on the eyeball image data. Further, the processing of the biometric data may include obtaining a normalized iris image based on the performing of the iris preprocessing. Further, the processing of the biometric data may include analyzing the normalized iris image using the machine learning model. Further, the determining of the one or more iris features may be based on the analyzing of the normalized iris image.

Further, in some embodiments, the processing of the biometric data may include performing a periocular preprocessing on the eyeball image data. Further, the processing of the biometric data may include obtaining a local periocular region image based on the performing of the periocular preprocessing. Further, the processing of the biometric data may include analyzing the local periocular region image using the machine learning model. Further, the determining of the one or more periocular features may be based on the analyzing of the local periocular region image.

In some embodiments, the machine learning model includes one or more first machine learning models associated with one or more first schemes and one or more second machine learning models associated with one or more second schemes. Further, the analyzing of the normalized iris image includes analyzing the normalized iris image using the one or more first machine learning models and the one or more second machine learning models. Further, the analyzing of the local periocular region image includes analyzing of the local periocular region image using the one or more first machine learning models and the one or more second machine learning models. Further, the determining of the one or more iris features may be based on the analyzing of the normalized iris image using the one or more first machine learning models and the one or more second machine learning models. Further, the determining of the one or more periocular features may be based on the analyzing of the local periocular region image using the one or more first machine learning models and the one or more second machine learning models.

Further, in some embodiments, the determining of the one or more iris features may include determining one or more first iris features corresponding to the one or more first schemes and one or more second iris features corresponding to the one or more second schemes based on the analyzing of the normalized iris image using the one or more first machine learning models and the one or more second machine learning models. Further, the determining of the one or more iris features may include concatenating the one or more first iris features and the one or more second iris features. Further, the determining of the one or more iris features may include obtaining the one or more iris features based on the concatenating of the one or more first iris features and the one or more second iris features.

Further, in some embodiments, the determining of the one or more periocular features may include determining one or more first periocular features corresponding to the one or more first schemes and one or more second periocular features corresponding to the one or more second schemes based on the analyzing of the local periocular region image using the one or more first machine learning models and the one or more second machine learning models. Further, the determining of the one or more periocular features may include concatenating the one or more first periocular features and the one or more second periocular features. Further, the determining of the one or more periocular features may include obtaining the one or more periocular features based on the concatenating of the one or more first periocular features and the one or more second periocular features.

Further, in some embodiments, the processing device 504 may be configured for generating one or more features for the iris and the periocular region based on the concatenating of the one or more iris features and the one or more periocular features. Further, the processing device 504 may be configured for performing a key generation process on the one or more features. Further, the processing device 504 may be configured for generating one or more keys for the enrolled image data based on the performing of the key generation process.

In some embodiments, the processing device 504 may be further configured for generating one or more cancelable biometrics for the enrolled image data using the one or more keys. Further, the storage device 506 may be configured for storing the one or more cancelable biometrics in the database.

Figure 6:
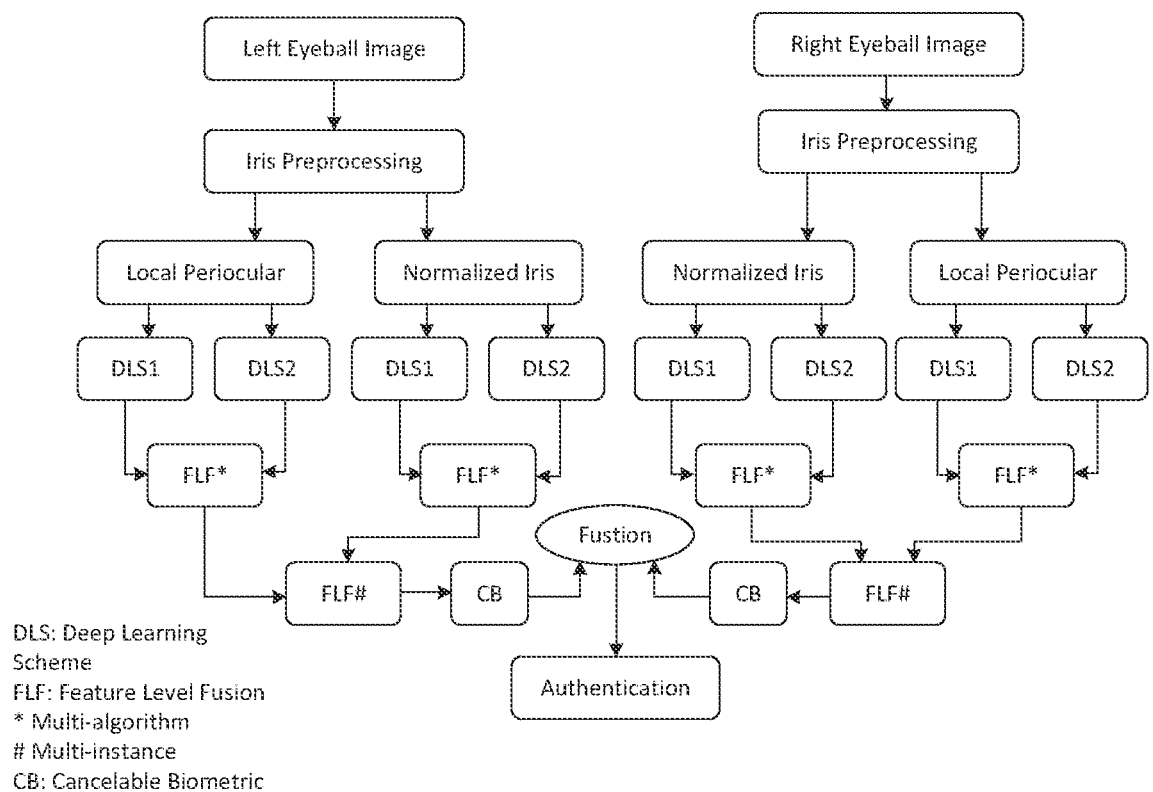
FIG. 6 illustrates a block diagram of a system for facilitating biometric recognition, in accordance with some embodiments.

FIG. 6 illustrates a block diagram of a system for facilitating biometric recognition, in accordance with some embodiments.

Figure 7:
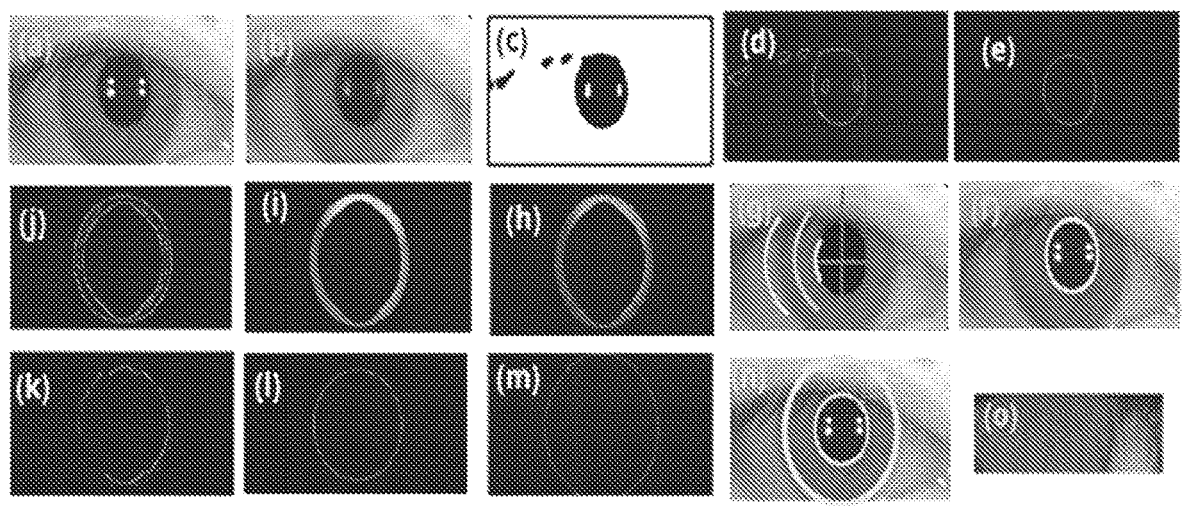
FIG. 7 illustrates eyeball image data, in accordance with some embodiments.

FIG. 7 illustrates eyeball image data, in accordance with some embodiments.

Figure 8:
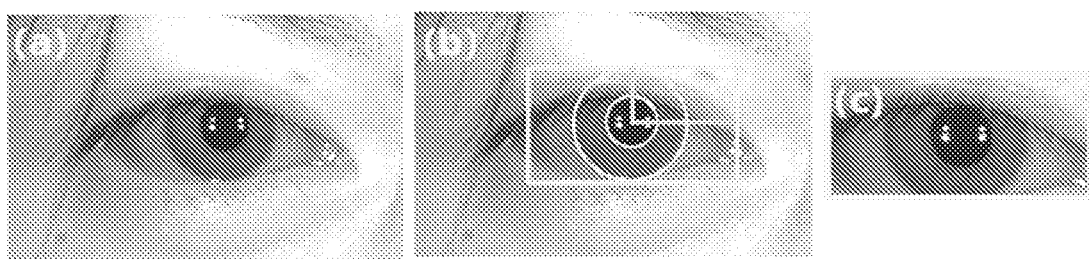
FIG. 8 illustrates eyeball image data, in accordance with some embodiments.

FIG. 8 illustrates eyeball image data, in accordance with some embodiments.

FIG. 9 illustrates a convolutional neural network (CNN) architecture, in accordance with some embodiments.

FIG. 10 illustrates a table comprising layers, an output shape, an image size, and parameters of a convolutional neural network (CNN) architecture, in accordance with some embodiments.

FIG. 11 illustrates a convolutional neural network (CNN) architecture, in accordance with some embodiments.

FIG. 12A illustrates a table comprising layers, an output shape, an image size, and parameters of a convolutional neural network (CNN) architecture, in accordance with some embodiments.

FIG. 12B is a continuation of the table of FIG. 12A, in accordance with some embodiments.

FIG. 13 is a block diagram of a system for facilitating biometric recognition, in accordance with some embodiments.

Figure 14:
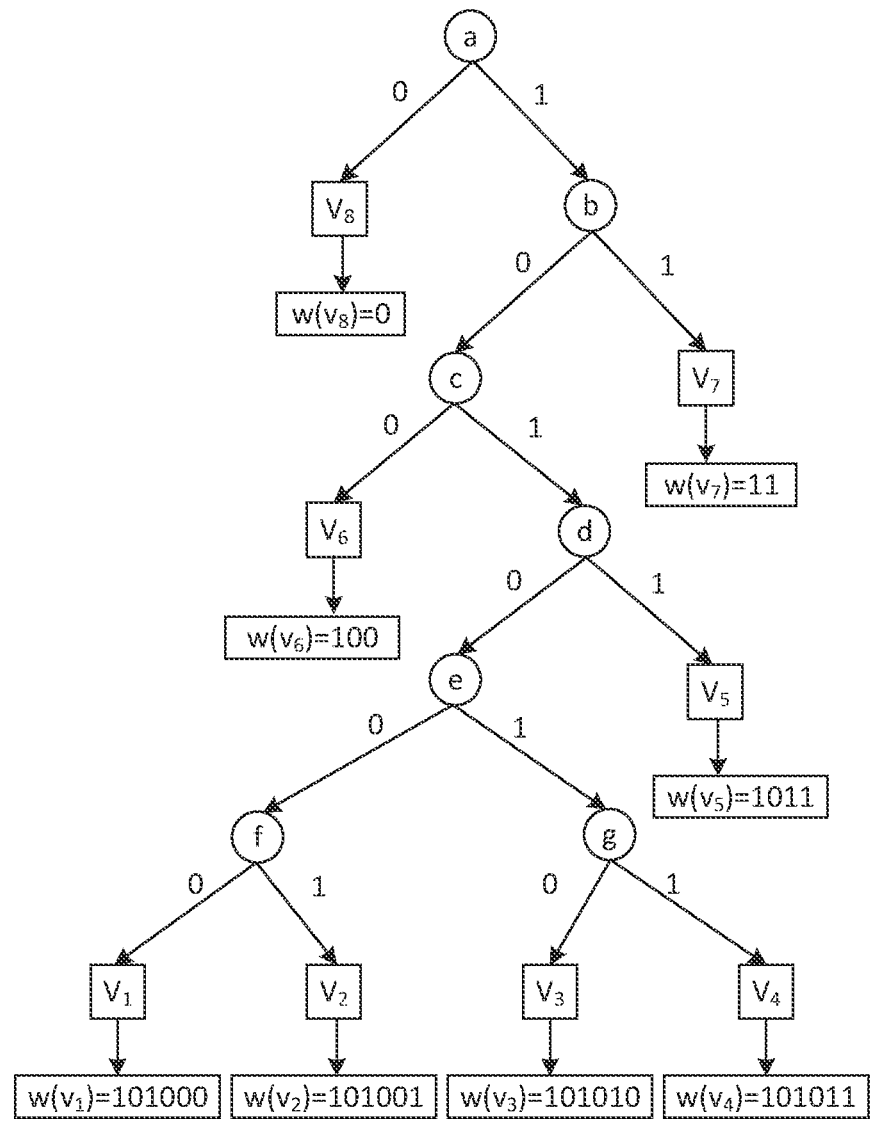
FIG. 14 illustrates an example of a Huffman tree for a key generation process, in accordance with some embodiments.

FIG. 14 illustrates an example of a Huffman tree for a key generation process, in accordance with some embodiments.

FIG. 15 illustrates a flow diagram of a Huffman algorithm for a key generation process, in accordance with some embodiments.

Figure 16:
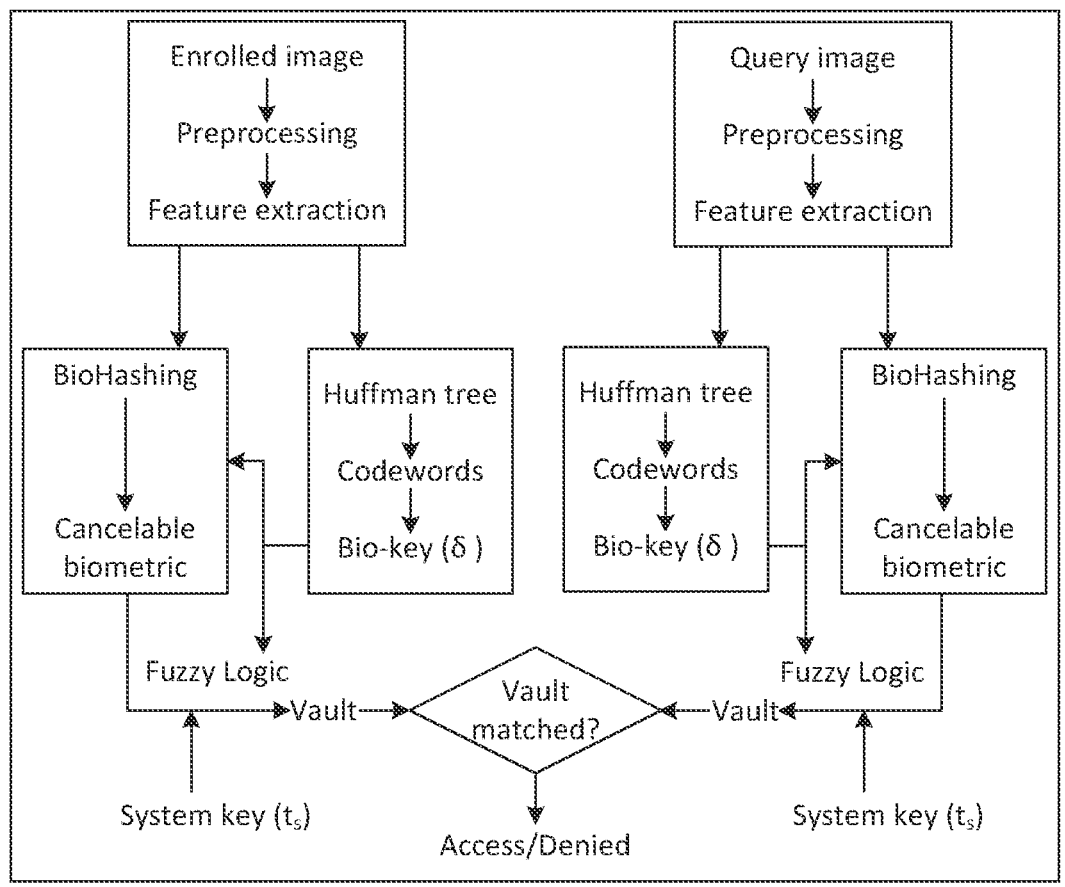
FIG. 16 illustrates a block diagram for facilitating biometric recognition, in accordance with some embodiments.

FIG. 16 illustrates a block diagram for facilitating biometric recognition, in accordance with some embodiments.

Figure 17:
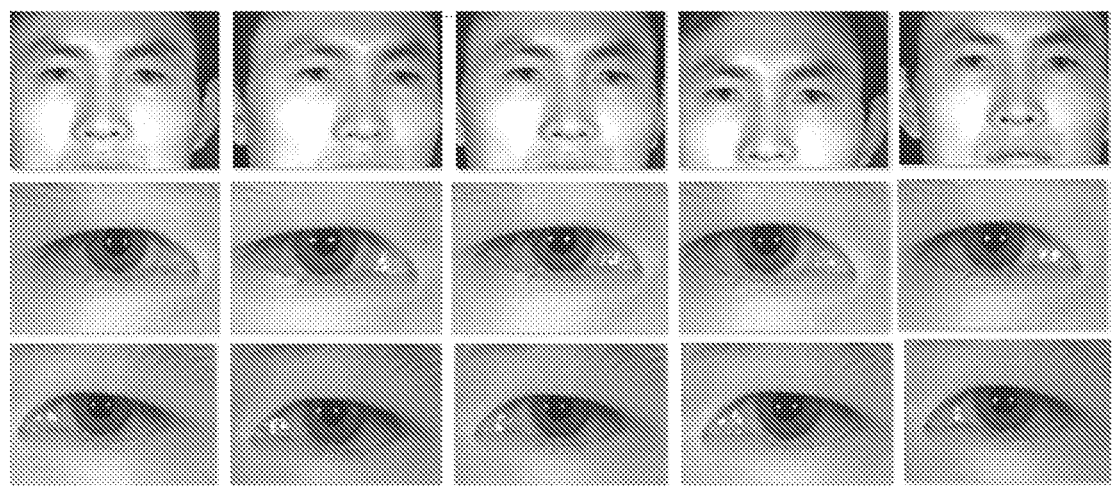
FIG. 17 illustrates eyeball image data for facilitating biometric recognition, in accordance with some embodiments.

FIG. 17 illustrates eyeball image data for facilitating biometric recognition, in accordance with some embodiments.

Figure 18:
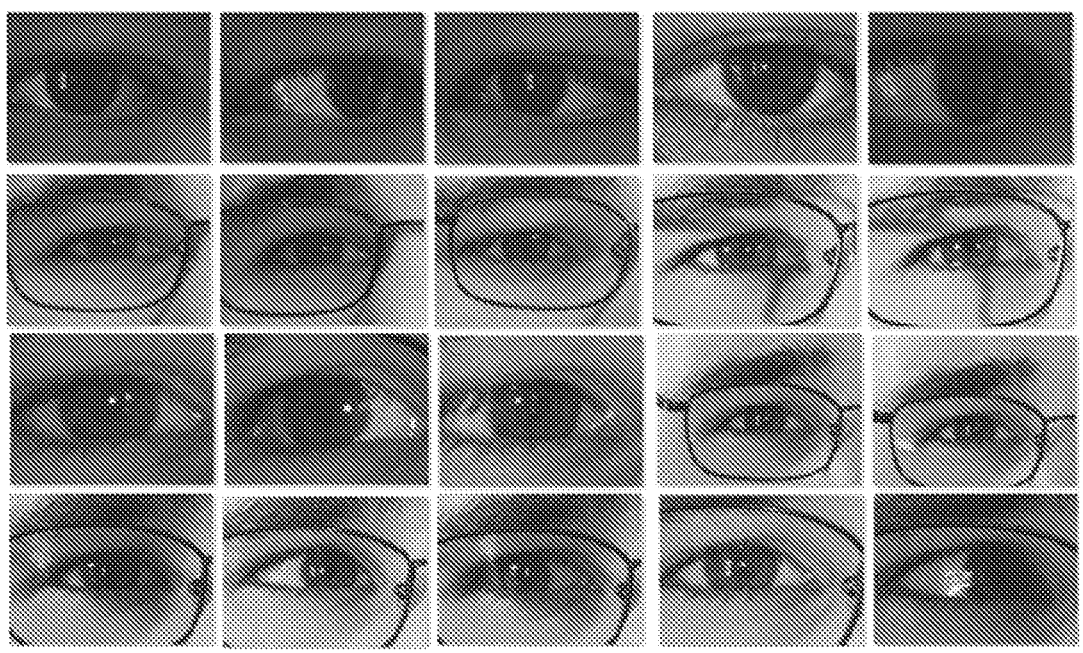
FIG. 18 illustrates eyeball image data for facilitating biometric recognition, in accordance with some embodiments.

FIG. 18 illustrates eyeball image data for facilitating biometric recognition, in accordance with some embodiments.

FIG. 19 illustrates a table of a database data for facilitating biometric recognition, in accordance with some embodiments.

FIG. 20 illustrates a graph of a performance of a system for facilitating biometric recognition, in accordance with some embodiments.

FIG. 21 illustrates a graph of a performance of a system for facilitating biometric recognition, in accordance with some embodiments.

Figure 22:
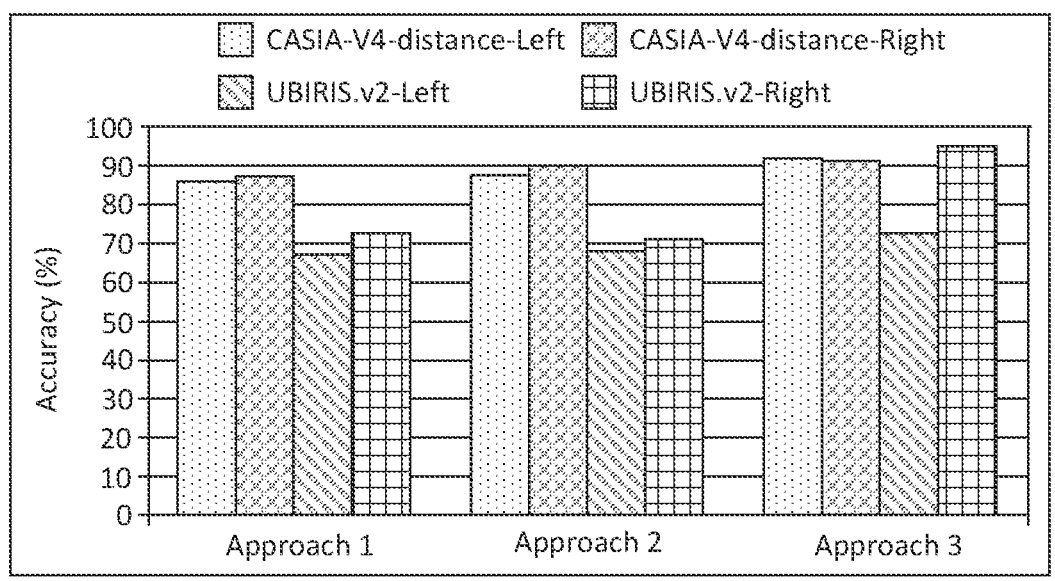
FIG. 22 illustrates a graph of a performance of a system for facilitating biometric recognition, in accordance with some embodiments.

FIG. 22 illustrates a graph of a performance of a system for facilitating biometric recognition, in accordance with some embodiments.

FIG. 23 illustrates a table of a performance data of a system for facilitating biometric recognition, in accordance with some embodiments.

FIG. 24 illustrates a table of a performance data of a system for facilitating biometric recognition, in accordance with some embodiments.

FIG. 25 illustrates a table of a performance data of a system for facilitating biometric recognition, in accordance with some embodiments.

FIG. 26 illustrates a table of a performance data of a system for facilitating biometric recognition, in accordance with some embodiments.

FIG. 27 illustrates a table of a comparison of the performance of a system for facilitating biometric recognition, in accordance with some embodiments. Further, the performance of the disclosed system is compared concerning iris and periocular recognition individually using the employed databases. For comparison purposes, several existing state-of-the-art biometric features have been implemented from their respective source. The existing state-of-the-art biometric features have been tested under the same training-testing protocols used by the system. Here, for the methods like Masek [1], Ma [2], Ko [3], Rathgeb [4], and Monro [5], the University of Salzburg Iris Toolkit (USIT) [6] software have been employed whereas other competing methods have been implemented thoroughly for the comparison purposes. The performance comparison of these methods has been reported in the table of FIG. 27. From this comparison, it is clear that the disclosed system has achieved outstanding performance for both iris and periocular recognition systems. It has also been observed that the proposed system has achieved better performance due to multi-algorithm, multi-biometric, and multi-instance schemes. Incorporating these schemes facilitates (i) overall enhancing the performance of the recognition systems, (ii) several challenging issues of unconstrained environments for image acquisitions, are handled, (iii) more discriminant and distinctive features are extracted with outstanding performances, (iv) several intermediate deep features are extracted that facilitates the high generalization capability of distinguishing patterns in the biometric traits, (v) due to several feature level fusions of deep intermediate features, enhances the securities, irrevocability, and non-transferability of extracted biometric features from external attacks and misuse.

FIG. 28 illustrates a table of a performance data of a system for facilitating biometric recognition, in accordance with some embodiments.

FIG. 29 illustrates a table of a comparison of a performance of a system for facilitating biometric recognition, in accordance with some embodiments.

FIG. 30 illustrates a table of an execution time for a system for facilitating biometric recognition, in accordance with some embodiments.

FIG. 31 illustrates a table comprising time complexities of a system for facilitating biometric recognition, in accordance with some embodiments.

Figure 32:
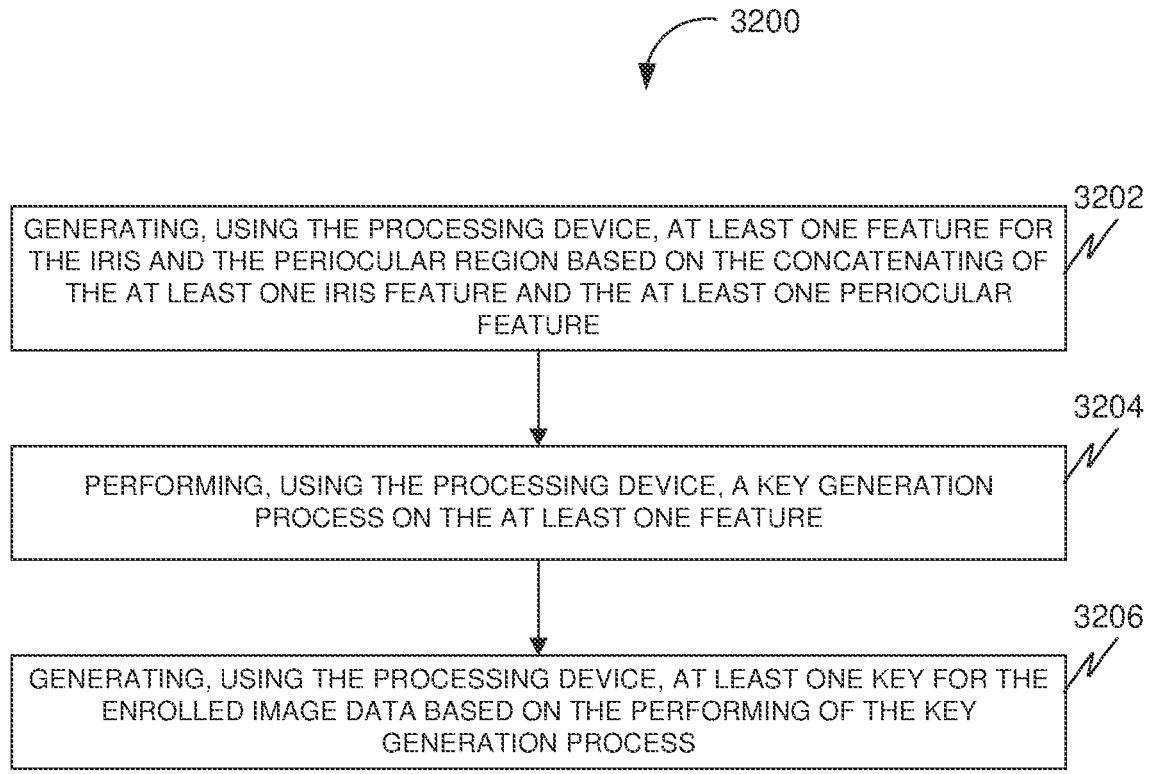
FIG. 32 illustrates a flowchart of a method 3200 for facilitating biometric recognition, in accordance with some embodiments.

FIG. 32 illustrates a flowchart of a method 3200 for facilitating biometric recognition, in accordance with some embodiments. Further, in some embodiments, the method 3200 may include a step 3202 of generating, using the processing device, one or more features for the iris and the periocular region based on the concatenating of the one or more iris features and the one or more periocular features. Further, in some embodiments, the method 3200 may include a step 3204 of performing, using the processing device, a key generation process on the one or more features. Further, in some embodiments, the method 3200 may include a step 3206 of generating, using the processing device, one or more keys for the enrolled image data based on the performing of the key generation process.

Figure 33:
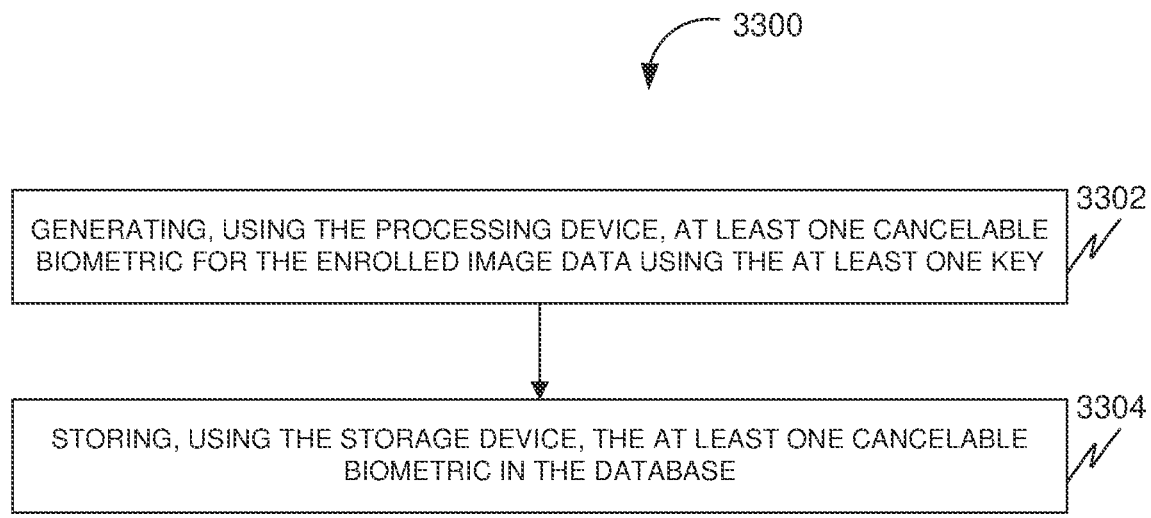
FIG. 33 illustrates a flowchart of a method 3300 for facilitating biometric recognition, in accordance with some embodiments.

FIG. 33 illustrates a flowchart of a method 3300 for facilitating biometric recognition, in accordance with some embodiments. Further, in some embodiments, the method 3300 may include a step 3302 of generating, using the processing device, one or more cancelable biometrics for the enrolled image data using the one or more keys. Further, in some embodiments, the method 3300 may include a step 3304 of storing, using the storage device, the one or more cancelable biometrics in the database.

Although the invention has been explained in relation to its preferred embodiment, it is to be understood that many other possible modifications and variations can be made without departing from the spirit and scope of the invention as hereinafter claimed.

REFERENCES

[1] L. Masek and P. Kovesi, "Matlab source code for a biometric identification system based on iris patterns," The School of Computer Science and Software Engineering, The University of Western Australia, vol. 26, 2003.
[2] L. Ma, T. Tan, Y. Wang, and D. Zhang, "Personal identification based on iris texture analysis," PAMI, IEEE Trans. on, vol. 25, no. 12, pp. 1519-1533, 2003.
[3] J.-G. Ko, Y.-H. Gil, J.-H. Yoo, and K.-I. Chung, "A novel and efficient feature extraction method for iris recognition," ETRI journal, vol. 29, no. 3, pp. 399-401, 2007.
[4] C. Rathgeb and A. Uhl, "Context-based biometric key generation for iris," IET computer vision, vol. 5, no. 6, pp. 389-397, 2011.
[5] D. M. Monro, S. Rakshit, and D. Zhang, "Dct-based iris recognition," Pattern Analysis and Machine Intelligence, IEEE Transactions on, vol. 29, no. 4, pp. 586-595, 2007.
[6] C. Rathgeb, A. Uhl, and P. Wild, "Iris recognition: from segmentation to template security," 2012.
[7] J. Daugman, "How iris recognition works," CSVT, IEEE Trans. on, vol. 14, no. 1, pp. 21-30, 2004.
[8] S. Lazebnik, C. Schmid, and J. Ponce, "Beyond bags of features: Spatial pyramid matching for recognizing natural scene categories," in Computer Vision and Pattern Recognition, 2006 IEEE Computer Society Conference on, vol. 2. IEEE, 2006, pp. 2169-2178.
[9] G. Zhao and M. Pietikainen, "Dynamic texture recognition using local binary patterns with an application to facial expressions," Pattern Analysis and Machine Intelligence, IEEE Transactions on, vol. 29, no. 6, pp. 915-928, 2007.
[10] J. Yang, K. Yu, Y. Gong, and T. Huang, "Linear spatial pyramid matching using sparse coding for image classification," in Computer Vision and Pattern Recognition, 2009. CVPR 2009. IEEE Conference on. IEEE, 2009, pp. 1794-1801.
[11] J. Wang, J. Yang, K. Yu, F. Lv, T. Huang, and Y. Gong, "Locality-constrained linear coding for image classification," in Computer Vision and Pattern Recognition (CVPR), 2010 IEEE Conference on. IEEE, 2010, pp. 3360-3367.

[12] C.-W. Tan and A. Kumar, "Accurate iris recognition at a distance using stabilized iris encoding and zernike moments phase features," Image Processing, IEEE Transactions on, vol. 23, no. 9, pp. 3962-3974, 2014.

[13] J. Chen, F. Shen, D. Z. Chen, and P. J. Flynn, "Iris recognition based on human-interpretable features," IEEE Transactions on Information Forensics and Security, vol. 11, no. 7, pp. 1476-1485, 2016.

[14] H. Proenca and J. C. Neves, "Deep-prwis: Periocular recognition without the iris and sclera using deep learning frameworks," IEEE Transactions on Information Forensics and Security, vol. 13, no. 4, pp. 888-896, 2018.

[15] S. Umer, B. C. Dhara, and B. Chanda, "Nir and vw iris image recognition using ensemble of patch statistics features," The Visual Computer, vol. 35, no. 9, pp. 1327-1344, 2019.

What is claimed is:

1. A method for facilitating biometric recognition, wherein the method comprises:
   receiving, using a communication device, a biometric data of a biometric from a user device associated with a user, wherein the biometric data comprises an eyeball image data of at least one of a left eye and a right eye, wherein the eyeball image data comprises a periocular region image of a periocular region of at least one of the left eye and the right eye and an iris image of an iris of at least one of the left eye and the right eye, wherein the biometric comprises the periocular region and the iris;
   processing, using a processing device, the biometric data using a machine learning model, wherein the machine learning model comprises at least one first machine learning model associated with at least one first scheme and at least one second machine learning model associated with at least one second scheme, wherein the processing of the biometric data comprises:
      performing an iris preprocessing on the eyeball image data;
      obtaining a normalized iris image based on the performing of the iris preprocessing;
      analyzing the normalized iris image using the machine learning model, wherein the analyzing of the normalized iris image comprises analyzing the normalized iris image using the at least one first machine learning model and the at least one second machine learning model;
   determining, using the processing device, at least one iris feature of the iris based on the processing, wherein the determining of the at least one iris feature is further based on the analyzing of the normalized iris image using the at least one first machine learning model and the at least one second machine learning model, wherein the determining of the at least one iris feature comprises:
      determining at least one first iris feature corresponding to the at least one first scheme and at least one second iris feature corresponding to the at least one second scheme based on the analyzing of the normalized iris image using the at least one first machine learning model and the at least one second machine learning model;
      concatenating the at least one first iris feature and the at least one second iris feature; and
      obtaining the at least one iris feature based on the concatenating of the at least one first iris feature and the at least one second iris feature;
   determining, using the processing device, at least one periocular feature of the periocular region based on the processing;
   concatenating, using the processing device, the at least one iris feature and the at least one periocular feature;
   generating, using the processing device, an enrolled image data based on the concatenating; and
   storing, using a storage device, the enrolled image data in a database.

2. The method of claim 1, wherein the iris image comprises a left iris image of the left eye and a right iris image of the right eye, wherein the periocular region image comprises a left periocular region image of the left eye and a right periocular region image of the right eye, wherein the at least one iris feature comprises at least one left iris feature corresponding to the left eye and at least one right iris feature corresponding to the right eye, wherein the at least one periocular feature comprises at least one left periocular feature corresponding to the left eye and at least one right periocular feature corresponding to the right eye.

3. The method of claim 1, wherein the method comprises:
   receiving, using the communication device, a query biometric data from the user device;
   retrieving, using the storage device, an encrypted biometric data from the database based on the query biometric data, wherein the encrypted biometric data comprises a plurality of enrolled biometric data;
   comparing, using the processing device, the query biometric data and the encrypted biometric data;
   generating, using the processing device, a notification data based on the comparing of the query biometric data and the encrypted biometric data; and
   transmitting, using the communication device, the notification data to the user device.

4. The method of claim 1, wherein the processing of the biometric data comprises:
   performing a periocular preprocessing on the eyeball image data;
   obtaining a local periocular region image based on the performing of the periocular preprocessing; and
   analyzing the local periocular region image using the machine learning model, wherein the determining of the at least one periocular feature is further based on the analyzing of the local periocular region image.

5. The method of claim 4, wherein the analyzing of the local periocular region image comprises analyzing of the local periocular region image using the at least one first machine learning model and the at least one second machine learning model, wherein the determining of the at least one periocular feature is further based on the analyzing of the local periocular region image using the at least one first machine learning model and the at least one second machine learning model.

6. The method of claim 5, wherein the determining of the at least one periocular feature comprises:
   determining at least one first periocular feature corresponding to the at least one first scheme and at least one second periocular feature corresponding to the at least one second scheme based on the analyzing of the local periocular region image using the at least one first machine learning model and the at least one second machine learning model;
   concatenating the at least one first periocular feature and the at least one second periocular feature; and
   obtaining the at least one periocular feature based on the concatenating of the at least one first periocular feature and the at least one second periocular feature.

7. The method of claim 1 further comprising:
performing, using the processing device, a key generation process on at least one feature for the iris region and the periocular region, wherein the at least one feature is generated by using the processing device and is based on the concatenating of the at least one iris feature and the at least one periocular feature; and
generating, using the processing device, at least one key for the enrolled image data based on the performing of the key generation process.

8. The method of claim 7 further comprising:
generating, using the processing device, at least one cancelable biometric for the enrolled image data using the at least one key; and
storing, using the storage device, the at least one cancelable biometric in the database.

9. A system for facilitating biometric recognition, wherein the system comprises:
a communication device configured for receiving a biometric data of a biometric from a user device associated with a user, wherein the biometric data comprises an eyeball image data of at least one of a left eye and a right eye, wherein the eyeball image data comprises a periocular region image of a periocular region of at least one of the left eye and the right eye and an iris image of an iris of at least one of the left eye and the right eye, wherein the biometric comprises the periocular region and the iris;
a processing device communicatively coupled with the communication device, wherein the processing device is configured for:
processing the biometric data using a machine learning model, wherein the machine learning model comprises at least one first machine learning model associated with at least one first scheme and at least one second machine learning model associated with at least one second scheme, wherein the processing of the biometric data comprises:
performing an iris preprocessing on the eyeball image data;
obtaining a normalized iris image based on the performing of the iris preprocessing;
analyzing the normalized iris image using the machine learning model, wherein the analyzing of the normalized iris image comprises analyzing the normalized iris image using the at least one first machine learning model and the at least one second machine learning model;
determining at least one iris feature of the iris based on the processing, wherein the determining of the at least one iris feature is further based on the analyzing of the normalized iris image using the at least one first machine learning model and the at least one second machine learning model, wherein the determining of the at least one iris feature comprises:
determining at least one first iris feature corresponding to the at least one first scheme and at least one second iris feature corresponding to the at least one second scheme based on the analyzing of the normalized iris image using the at least one first machine learning model and the at least one second machine learning model;
concatenating the at least one first iris feature and the at least one second iris feature; and
obtaining the at least one iris feature based on the concatenating of the at least one first iris feature and the at least one second iris feature;
determining at least one periocular feature of the periocular region based on the processing;
concatenating the at least one iris feature and the at least one periocular feature; and
generating an enrolled image data based on the concatenating; and
a storage device communicatively coupled with the processing device, wherein the storage device is configured for storing the enrolled image data in a database.

10. The system of claim 9, wherein the iris image comprises a left iris image of the left eye and a right iris image of the right eye, wherein the periocular region image comprises a left periocular region image of the left eye and a right periocular region image of the right eye, wherein the at least one iris feature comprises at least one left iris feature corresponding to the left eye and at least one right iris feature corresponding to the right eye, wherein the at least one periocular feature comprises at least one left periocular feature corresponding to the left eye and at least one right periocular feature corresponding to the right eye.

11. The system of claim 9, wherein the communication device is further configured for:
receiving a query biometric data from the user device; and
transmitting a notification data to the user device, wherein the storage device is further configured for retrieving an encrypted biometric data from the database based on the query biometric data, wherein the encrypted biometric data comprises a plurality of enrolled biometric data, wherein the processing device is further configured for:
comparing the query biometric data and the encrypted biometric data; and
generating the notification data based on the comparing of the query biometric data and the encrypted biometric data.

12. The system of claim 9, wherein the processing of the biometric data comprises:
performing a periocular preprocessing on the eyeball image data;
obtaining a local periocular region image based on the performing of the periocular preprocessing; and
analyzing the local periocular region image using the machine learning model, wherein the determining of the at least one periocular feature is further based on the analyzing of the local periocular region image.

13. The system of claim 12, wherein the analyzing of the local periocular region image comprises analyzing of the local periocular region image using the at least one first machine learning model and the at least one second machine learning model, wherein the determining of the at least one periocular feature is further based on the analyzing of the local periocular region image using the at least one first machine learning model and the at least one second machine learning model.

14. The system of claim 13, wherein the determining of the at least one periocular feature comprises:
determining at least one first periocular feature corresponding to the at least one first scheme and at least one second periocular feature corresponding to the at least one second scheme based on the analyzing of the local periocular region image using the at least one first machine learning model and the at least one second machine learning model;
concatenating the at least one first periocular feature and the at least one second periocular feature; and obtaining the at least one periocular feature based on the concatenating of the at least one first periocular feature and the at least one second periocular feature.

15. The system of claim 9, wherein the processing device is further configured for:
performing a key generation process on at least one feature for the iris region and the periocular region, wherein the at least one feature is generated using the processing device and is based on the concatenating of the at least one iris feature and the at least one periocular feature; and
generating at least one key for the enrolled image data based on the performing of the key generation process.

16. The system of claim 15, wherein the processing device is further configured for generating at least one cancelable biometric for the enrolled image data using the at least one key, wherein the storage device is further configured for storing the at least one cancelable biometric in the database.

* * * * *